(12) United States Patent
Okimura

(10) Patent No.: US 10,308,091 B2
(45) Date of Patent: Jun. 4, 2019

(54) SUSPENSION SYSTEM

(71) Applicant: TOYOTA JIDOSHA KABUSHIKI KAISHA, Toyota-shi, Aichi (JP)

(72) Inventor: Kohtaroh Okimura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 15/496,431

(22) Filed: Apr. 25, 2017

(65) Prior Publication Data

US 2017/0305226 A1  Oct. 26, 2017

(30) Foreign Application Priority Data

Apr. 26, 2016 (JP) .................. 2016-087708

(51) Int. Cl.
*B60G 17/04* (2006.01)
*B60G 17/033* (2006.01)
*B60G 17/056* (2006.01)

(52) U.S. Cl.
CPC ....... *B60G 17/0416* (2013.01); *B60G 17/033* (2013.01); *B60G 17/056* (2013.01); *B60G 2400/0521* (2013.01); *B60G 2400/0523* (2013.01); *B60G 2400/102* (2013.01); *B60G 2400/104* (2013.01); *B60G 2400/106* (2013.01); *B60G 2400/204* (2013.01); *B60G 2400/252* (2013.01); *B60G 2400/41* (2013.01); *B60G 2400/51* (2013.01); *B60G 2500/30* (2013.01)

(58) Field of Classification Search
CPC .......................... B60G 17/0416; B60G 17/033; B60G 17/056; B60G 2400/252; B60G 2400/204; B60G 2400/106; B60G 2400/51; B60G 2400/102; B60G 2400/0523; B60G 2400/0521; B60G 2500/30; B60G 2400/41; B60G 2400/104

See application file for complete search history.

(56) References Cited

U.S. PATENT DOCUMENTS 6,669,216 B1    12/2003  Elser et al.
2006/0055129 A1  3/2006  Amano

FOREIGN PATENT DOCUMENTS

DE       198 44 493 A1    3/2000
DE    10 2005 043 549 A1  3/2006
JP       2008-168861 A    7/2008

*Primary Examiner* — Paul N Dickson
*Assistant Examiner* — Joselynn Y Sliteris
(74) *Attorney, Agent, or Firm* — Oliff PLC

(57) ABSTRACT

To improve off-road travel performance, ECU is configured to: set one of front left and right wheels and rear left and right wheels as roll stiffness decrease subject wheels and set another as non-roll stiffness decrease subject wheels; bring a spring switching valve and a leveling valve into an open state for each of the roll stiffness decrease subject wheels, causing left and right hydraulic cylinders to communicate to each other for the roll stiffness decrease subject wheels; and bring the spring switching valve and the leveling valve into a closed state and bring a bypass valve into the open state for one of the left and right wheels of the non-roll stiffness decrease subject wheels, to cause a second gas spring for one of the left and right wheels of the non-roll stiffness decrease subject wheels to communicate to the hydraulic cylinders of the roll stiffness decrease subject wheels.

4 Claims, 9 Drawing Sheets

SUSPENSION SYSTEM

BACKGROUND OF THE INVENTION

1. Field of the Invention

The present invention relates to a suspension system capable of switching a wheel rate.

2. Description of the Related Art

Hitherto, there is known a suspension system capable of switching a wheel rate as proposed, for example, in Japanese Patent Application Laid-open No. 2008-168861. In this suspension system, a hydraulic cylinder (shock absorber) is provided between a vehicle body and a wheel holding member for each of front/rear left/right wheels, and a high pressure accumulator having a high spring constant and a low pressure accumulator having a low spring constant communicate to each of the hydraulic cylinders. Those two accumulators function as springs in a hydraulic system.

A spring switching valve capable of switching between a state in which communication between the hydraulic cylinder and the low pressure accumulator is allowed and a state in which the communication is shut off is provided on a passage for causing the hydraulic cylinder and the low pressure accumulator to communicate to each other. Thus, the wheel rate can be switched by opening/closing the spring switching valve. The wheel rate is a spring constant at a wheel position, and represents a ratio between a change in a vertical load imposed on a wheel and a change in a vertical distance (wheel travel) between a vehicle body and a wheel center in the wheel, namely, an amount of a change in the vertical load imposed on the wheel required to generate a unit wheel travel.

The high pressure accumulator and the low pressure accumulator communicate to the hydraulic cylinder (spring switching valve: open), and the wheel rate is set small (soft) during a normal travel in this suspension system. Moreover, the communication between the hydraulic cylinder and the low pressure accumulator is shut off (spring switching valve: closed), and the wheel rate is set large (hard) during a quick turn, or a quick acceleration/deceleration.

Moreover, this suspension system has a function of using hydraulic pressure control for the hydraulic cylinders to adjust a vehicle height, and a hydraulic pressure control circuit for the vehicle height adjustment may be used to set the wheel rate to medium. In this case, a pair of the hydraulic cylinders for the left and right wheels are caused to communicate to each other, and the low pressure accumulator for one of the left and right wheels is caused to communicate to the hydraulic cylinders. As a result, the hydraulic cylinders for the left/right two wheels are maintained under a state in which those hydraulic cylinders communicate to the two high pressure accumulators and the one low pressure accumulator in total. Moreover, a pair of the hydraulic cylinders for the front and rear wheels may be caused to communicate to each other, thereby setting the wheel rate to medium. In this case, the low pressure accumulator for one of the front/rear wheels is caused to communicate to the hydraulic cylinders. As a result, the hydraulic cylinders for the front/rear two wheels are maintained under a state in which those hydraulic cylinders communicate to the two high pressure accumulators and the one low pressure accumulator in total.

The mutual communication state between the hydraulic cylinders between the left/right wheels or the front/rear wheels, and the communication state between the hydraulic cylinders and the low pressure accumulator can be switched to switch the wheel rate to any one of hard, medium, and soft in this way.

In general, the wheel rates of the left/right wheels are approximately equal to each other, and even when the hydraulic cylinders for the left/right wheels are caused to communicate to each other, the wheel rate does not decrease below the minimum wheel rate of each wheel. In other words, the wheel rates of the left/right wheels cannot be decreased below the wheel rate determined by the one high pressure accumulator and the one low pressure accumulator provided for each of the hydraulic cylinders.

Moreover, when the hydraulic cylinders are caused to communicate to each other between the front/rear wheels, the wheel rates of the front/rear wheels take a medium value of the wheel rate of the front wheel and the wheel rate of the rear wheel. As a result, for example, when the wheel rate of the front wheel is set to be less than the wheel rate of the rear wheel, and the communication is formed as described above, the wheel rate of the front wheel cannot be decreased.

In order to travel off-road, it is important to decrease roll stiffness, thereby increasing wheel articulation (stroke displacement) of each wheel so that the wheel is always in contact with the ground. However, a possible extent of the decrease in the wheel rate is small in the above-mentioned suspension system. As a result, there is room for improvement in the off-road travel performance in a vehicle provided with the above-mentioned suspension system.

SUMMARY OF THE INVENTION

The present invention has been made in view of the above-mentioned problem, and therefore has an object to improve an off-road travel performance.

In order to achieve the above-mentioned object, a feature of one embodiment of the present invention resides in a suspension system, including:

a hydraulic cylinder (20), which is provided between a wheel holding member and a vehicle body on each of front/rear left/right wheels of a vehicle, the hydraulic cylinder being configured to store working fluid and extend or contract depending on a change in a distance between the wheel holding member and the vehicle body;

a first gas spring (31), which is provided so as to correspond to each of the hydraulic cylinders for the front/rear left/right wheels, the first gas spring including a first gas chamber and a first oil chamber communicating to the hydraulic cylinder in partitions, and being configured to function as a spring in a hydraulic system based on an amount of the working fluid stored in the first oil chamber changing depending on a hydraulic pressure in the hydraulic cylinder;

a second gas spring (32), which is provided for each of the hydraulic cylinders, the second gas spring including a second gas chamber and a second oil chamber communicating to the hydraulic cylinder in partitions, and being configured to function as a spring in the hydraulic system based on an amount of the working fluid stored in the second oil chamber changing depending on the hydraulic pressure in the hydraulic cylinder;

a spring switching valve (62), which is provided for each of the hydraulic cylinders, the spring switching valve being capable of switching between a state in which the communication between the hydraulic cylinder and the second gas spring is allowed and a state in which the communication is shut off;

wheel rate switching means (100, S34) for controlling the spring switching valve to switch a wheel rate; and roll stiffness decrease means (100, S37, S40) for setting, during rough road travel, one of the front left and right wheels and the rear left and right wheels as roll stiffness decrease subject wheels, and another one of the front left and right wheels and the rear left and right wheels as non-roll stiffness decrease subject wheels, to thereby cause the left and right hydraulic cylinders for the roll stiffness decrease subject wheels to communicate to each other while the spring switching valve is opened for each of the roll stiffness decrease subject wheels, and to thereby close the spring switching valve for at least one of the left and right wheels of the non-roll stiffness decrease subject wheels to cause the second gas spring shut off from the hydraulic cylinder for the wheel having the closed spring switching valve to communicate to the left and right hydraulic cylinders for the roll stiffness decrease subject wheels.

According to the one embodiment of the present invention, the hydraulic cylinder is provided between the wheel holding member and the vehicle body for each of the front/rear left/right wheels of the vehicle. The hydraulic cylinder stores the working fluid, and extends or contracts depending on the change in the distance between the wheel holding member and the vehicle body.

Each of the hydraulic cylinders is provided with the first gas spring and the second gas spring. The first gas spring includes the first gas chamber and the first oil chamber communicating to the hydraulic cylinder, the first gas chamber and the first oil chamber are partitioned from each other, and the first gas spring functions as a spring in the hydraulic system based on the amount of the working fluid stored in the first oil chamber changing depending on the hydraulic pressure in the hydraulic cylinder. The second gas spring includes the second gas chamber and the second oil chamber communicating to the hydraulic cylinder in partitions, and the second gas spring functions as a spring in the hydraulic system based on the amount of the working fluid stored in the second oil chamber changing depending on the hydraulic pressure in the hydraulic cylinder.

The second gas spring is switched by the spring switching valve between the state in which the communication to the hydraulic cylinder is allowed and the state in which the communication is shut off. Thus, when the spring switching valve is opened, the hydraulic cylinder is under the state in which the hydraulic cylinder communicates both to the first gas spring and the second gas spring, namely, a state (soft) where the wheel rate is set small. Moreover, when the spring switching valve is closed, the hydraulic cylinder is under the state in which the hydraulic cylinder communicates only to the first gas spring out of the first gas spring and the second gas spring, namely, a state (hard) where the wheel rate is set large.

The wheel rate of each of the wheels is switched by the wheel rate switching means. Thus, for example, an appropriate wheel rate can be selected depending on the travel state of the vehicle.

The suspension system includes the roll stiffness decrease means. The roll stiffness decrease means is configured to set, during rough road travel, one of the front left and right wheels and the rear left and right wheels as the roll stiffness decrease subject wheels, and another thereof as the non-roll stiffness decrease subject wheels, to thereby cause the left and right hydraulic cylinders for the roll stiffness decrease subject wheels to communicate to each other while the spring switching valve is opened for each of the roll stiffness decrease subject wheels, and to thereby close the spring switching valve for at least one of the left and right wheels of the non-roll stiffness decrease subject wheels to cause the second gas spring shut off from the hydraulic cylinder for the wheel having the closed spring switching valve to communicate to the left and right hydraulic cylinders for the roll stiffness decrease subject wheels.

Thus, the working fluid in the hydraulic cylinder operating in the contraction direction for one of the left and right wheels of the roll stiffness decrease subject wheels can be moved to the hydraulic cylinder for another one of the left and right wheels during the rough road travel. As a result, a force received from the road surface by the hydraulic cylinder for one of the left and right wheels, and acting as the contraction operation in the roll stiffness decrease subject wheels can be used as a force acting as an extension operation of the hydraulic cylinder for another wheel of the left and right wheels. Thus, the wheel articulation of the roll stiffness decrease subject wheels increases, and another one of the left and right wheels can thus be prevented from being lifted from the road surface (road holding property can be improved).

Moreover, the hydraulic cylinders for the roll stiffness decrease subject wheels communicate to the first gas springs and the second gas springs for the roll stiffness decrease subject wheels as well as the second gas spring of at least one of the left and right wheels of the non-roll stiffness decrease subject wheels. In this case, the hydraulic cylinders for the roll stiffness decrease subject wheels and the hydraulic cylinders for the non-roll stiffness decrease subject wheels do not communicate to each other. Therefore, the second gas spring of the non-roll stiffness decrease subject wheel can be used solely as a hydraulic system spring for the roll stiffness decrease subject wheels.

Thus, through increase of the number of gas springs communicating to the hydraulic cylinders for the roll stiffness decrease subject wheels, the wheel rates of the roll stiffness decrease subject wheels decrease. In other words, a hydraulic pressure absorption capacity of the gas springs communicating to the hydraulic cylinder for the roll stiffness decrease subject wheels can be increased more than the hydraulic pressure absorption capacity of the gas springs provided for each of the wheels, thereby further decreasing the wheel rates. As a result, the roll stiffness of the roll stiffness decrease subject wheels can further be decreased, thereby increasing the wheel articulation of the roll stiffness decrease subject wheels. As a result, the road holding property of the roll stiffness decrease subject wheels can further be increased.

As a result, according to the present invention, the off-road travel performance can be improved. Moreover, when the roll stiffness of the roll stiffness decrease subject wheels is decreased, the second gas spring of the non-roll stiffness decrease subject wheel is effectively used, and it is thus not necessary to newly provide an additional gas spring.

The rough road travel means a state in which an indication value representing inferiority of a state of the road surface on which the own vehicle travels is more than a threshold, for example, a state in which it is determined that the magnitude of a vehicle height difference between a pair of the left wheel and the right wheel is more than a threshold. In this case, for example, it is only necessary to consider the left and right wheels on the side (front wheel side or the rear wheel side) on which the magnitude of the vehicle height difference between the pair of the left wheel and the right wheel is more than the threshold as the roll stiffness decrease subject wheels.

A feature of one aspect of the present invention resides in that the suspension system further includes:

a working fluid supply/discharge device (70) configured to supply or discharge the working fluid to/from each of the hydraulic cylinders;

a supply/discharge hydraulic pressure control circuit (54, 64) including a supply/discharge source passage (54) serving as a passage that is connected to the working fluid supply/discharge device and through which the working fluid flows, and a source valve (64) for opening or closing the supply/discharge source passage;

a vehicle height adjustment hydraulic pressure control circuit (51, 61) including a vehicle height adjustment passage (51) being a flow passage for the working fluid for causing each of the hydraulic cylinders and the supply/discharge source passage to communicate to each other, and a vehicle height adjustment valve (61) for opening or closing the vehicle height adjustment passage, the vehicle height adjustment passage and the vehicle height adjustment valve being provided for each of the hydraulic cylinders;

a second gas spring hydraulic pressure control circuit (53, 63) including a bypass passage (53) for bypassing the spring switching valve and the vehicle height adjustment valve to cause each of the second gas springs and the supply/discharge source passage to communicate to each other and a bypass valve (63) for opening or closing the bypass passage, the bypass passage and the bypass valve being provided for each of the hydraulic cylinders; and vehicle height adjustment control means (100, S11, S21) for bringing the spring switching valve and the bypass valve into a closed state, and bringing the source valve and the vehicle height adjustment valve into an open state, thereby causing the hydraulic cylinder and the working fluid supply/discharge device to communicate to each other to adjust the vehicle height, and that the roll stiffness decrease means is configured to, under a state in which the source valve is closed, bring the spring switching valve and at least one of the bypass valve and the vehicle height adjustment valve into the open state for each of the roll stiffness decrease subject wheels, thereby causing the left and right hydraulic cylinders for the roll stiffness decrease subject wheels to communicate to each other, and bring the spring switching valve and the vehicle height adjustment valve into the closed state, and bring the bypass valve into the open state for at least one of the left and right wheels of the non-roll stiffness decrease subject wheels, thereby causing the second gas spring for at least one of the left and right wheels of the non-roll stiffness decrease subject wheels to communicate to the hydraulic cylinders for the roll stiffness decrease subject wheels.

The one aspect of the present invention includes the function of adjusting the vehicle heights at the front/rear left/right wheels, and the hydraulic pressure control circuit is used for the vehicle height adjustment, thereby causing the left and right hydraulic cylinders for the roll stiffness decrease subject wheels to communicate to each other. Moreover, the left and right hydraulic cylinders for the roll stiffness decrease subject wheels are caused to communicate to the second gas spring of at least one of the left and right wheels of the non-roll stiffness decrease subject wheels.

The adjustment of the pressure of the working fluid stored in the hydraulic cylinder enables the adjustment of the vehicle height at a wheel position for which this hydraulic cylinder is provided. The working fluid is supplied to and discharged from each of the hydraulic cylinders by the working fluid supply/discharge device and the supply/discharge hydraulic pressure control circuit, thereby adjusting the vehicle height. The working fluid supply/discharge device includes, for example, a high pressure source (e.g., pump) for supplying the working fluid to the hydraulic cylinder, and a low pressure source (e.g., reservoir tank) for discharging the working fluid from the hydraulic cylinder. The supply/discharge hydraulic pressure control circuit includes the supply/discharge source passage serving as the passage that is connected to the working fluid supply/discharge device, and through which the working fluid flows, and the source valve for opening/closing the supply/discharge source passage.

The suspension system includes the vehicle height adjustment hydraulic pressure control circuit and the second gas spring hydraulic pressure control circuit, which are provided in correspondence to each of the hydraulic cylinders. The vehicle height adjustment hydraulic pressure control circuit includes the vehicle height adjustment passage, which is a passage for causing each of the hydraulic cylinders and the supply/discharge source passage to communicate to each other, and the vehicle height adjustment valve for opening/closing the vehicle height adjustment passage. Thus, the hydraulic pressure in the hydraulic cylinder for the vehicle height adjustment subject wheel can be adjusted to adjust the vehicle height by bringing the source valve and the vehicle height adjustment valve for the vehicle height adjustment subject wheel into the open state.

The second gas spring hydraulic pressure control circuit includes the bypass passage, which is a passage for the working fluid for bypassing the spring switching valve and the vehicle height adjustment valve, and causing each of the second gas springs and the supply/discharge source passage to communicate to each other and the bypass valve for opening/closing the bypass passage. Thus, the hydraulic pressure of an arbitrary second gas spring can independently be adjusted by bringing the source valve and an arbitrary bypass valve into the open state.

The vehicle height adjustment control means is configured to bring the spring switching valve and the bypass valve into the closed state, and bring the source valve and the vehicle height adjustment valve into the open state, thereby causing the hydraulic cylinder and the working fluid supply/discharge device to communicate to each other to adjust the vehicle height. Thus, the hydraulic pressure in the hydraulic cylinder can be adjusted without supplying/discharging the working fluid to/from the second gas spring, an amount of the working fluid required for the vehicle height adjustment can be small, and a vehicle adjustment time can be decreased.

The roll stiffness decrease means is configured to, during the rough road travel and under the state in which the source valve is closed, bring the spring switching valve and at least one of the bypass valve and the vehicle height adjustment valve into the open state for each of the roll stiffness decrease subject wheels, thereby causing the left and right hydraulic cylinders for the roll stiffness decrease subject wheels to communicate to each other, and bring the spring switching valve and the vehicle height adjustment valve into the closed state, and bring the bypass valve into the open state for at least one of the left and right wheels of the non-roll stiffness decrease subject wheels, thereby causing the second gas spring for at least one of the left and right wheels of the non-roll stiffness decrease subject wheels to communicate to the hydraulic cylinders for the roll stiffness decrease subject wheels.

Thus, the hydraulic pressure control circuit for the vehicle height adjustment can be used to cause the left and right hydraulic cylinders for the roll stiffness decrease subject wheels to communicate to each other, thereby increasing the wheel articulation of the roll stiffness decrease subject wheels to prevent another wheel of the left and right wheels from lifting off the road surface during the rough road travel (road holding property can be improved).

Moreover, the hydraulic pressure control circuit for the vehicle height adjustment can be used to cause the second gas spring of at least one of the left and right wheels of the non-roll stiffness decrease subject wheels to communicate to the left and right hydraulic cylinders for the roll stiffness decrease subject wheels, thereby increasing the number of the gas springs communicating to the hydraulic cylinders for the roll stiffness decrease subject wheels. As a result, the roll stiffness of the roll stiffness decrease subject wheels can further be decreased, thereby increasing the wheel articulation of the roll stiffness decrease subject wheels. As a result, the road holding property of the roll stiffness decrease subject wheels can further be increased.

Moreover, when the second gas spring of at least one of the left and right wheels of the non-roll stiffness decrease subject wheels is caused to communicate to the left and right hydraulic cylinders for the roll stiffness decrease subject wheels, the spring switching valve for this non-roll stiffness decrease subject wheel is in the closed state, and a hydraulic pressure variation in the hydraulic cylinder for the non-roll stiffness decrease subject wheel is not caused by the opening operation of the bypass valve for the non-roll stiffness decrease subject wheel. Thus, the vehicle height at the non-roll stiffness decrease subject wheel can be prevented from changing. As a result, the vehicle body can be prevented from inclining in the longitudinal direction.

As a result, according to the present invention, the off-road travel performance can be improved.

A feature of one aspect of the present invention resides in that the suspension system further includes vehicle height difference detection means (S31) for detecting a magnitude ($\Delta LF$, $\Delta LR$) of a vehicle height difference between a pair of the left wheel and the right wheel, and that the roll stiffness decrease means is configured to:

set, when the magnitude of the vehicle height difference is more than a first threshold ($\Delta L1$), left and right wheels with the magnitude of the vehicle height difference being more than the first threshold, as the roll stiffness decrease subject wheels, and bring the spring switching valve and at least one of the bypass valve and the vehicle height adjustment valve into the open state for each of the roll stiffness decrease subject wheels, thereby causing the left and right hydraulic cylinders for the roll stiffness decrease subject wheels to communicate to each other (S36, S39); and further bring, when the magnitude of the vehicle height difference is more than a second threshold ($\Delta L2$) that is larger than the first threshold, the spring switching valve and the vehicle height adjustment valve into the closed state, and bring the bypass valve into the open state for at least one of the left and right wheels of the non-roll stiffness decrease subject wheels on the opposite side in the front/rear direction of the roll stiffness decrease subject wheels, and cause the second gas spring of at least one of the left and right wheels of the non-roll stiffness decrease subject wheels to communicate to the hydraulic cylinders for the roll stiffness decrease subject wheels (S37, S40).

According to the one aspect of the present invention, when the magnitude of the vehicle height difference between the pair of the left wheel and the right wheel is more than the first threshold, those left and right wheels for which the magnitude of the vehicle height difference is more than the first threshold are set to the roll stiffness decrease subject wheels. Then, the left and right hydraulic cylinders for the roll stiffness decrease subject wheels are caused to communicate to each other. As a result, the roll stiffness of the roll stiffness decrease subject wheels decreases, the wheel articulation increases, and another wheel of the left and right wheels can thus be prevented from being lifted from the road surface (road holding property can be improved).

When the magnitude of the vehicle height difference increases to become more than the second threshold, the second gas spring for at least one of the left and right wheels of the non-roll stiffness decrease subject wheels is further caused to communicate to the hydraulic cylinders for the roll stiffness decrease subject wheels. Thus, the number of gas springs communicating to the hydraulic cylinders for the roll stiffness decrease subject wheels increases, resulting in a further decrease in the wheel rates of the roll stiffness decrease subject wheels. As a result, the roll stiffness of the roll stiffness decrease subject wheels can further be decreased, thereby further increasing the wheel articulation of the roll stiffness decrease subject wheels.

According to the one aspect of the present invention, the roll stiffness of the roll stiffness decrease subject wheels can be decreased depending on the road surface state in this way. As a result, the off-road travel performance can be improved.

A feature of one aspect of the present invention resides in that the suspension system further includes:

hydraulic pressure storage means (S14, S23) for detecting and storing, when a vehicle height adjustment is completed by the vehicle height adjustment control means, a hydraulic pressure in a hydraulic cylinder corresponding to a wheel for which the vehicle height adjustment is completed; and second gas spring hydraulic pressure adjustment means (S15 to S17, S24 to S26) for bringing, after the vehicle height adjustment is completed, the source valve into the open state, the spring switching valve and the vehicle height adjustment valve corresponding to the wheel for which the vehicle height adjustment is completed into the closed state, and the bypass valve corresponding to the wheel for which the vehicle height adjustment is completed into the open state, thereby causing the second gas valve and the working fluid supply device to communicate to each other to adjust the hydraulic pressure of the second gas spring so that the hydraulic pressure of the second gas spring is equal to the hydraulic pressure stored in the hydraulic pressure storage means.

According to the one aspect of the present invention, when the vehicle height adjustment by the vehicle height adjustment control means is completed, the hydraulic pressure storage means detects and stores the hydraulic pressure in the hydraulic cylinder corresponding to the wheel for which the vehicle height adjustment is completed. Then, after the vehicle height adjustment is completed, the second gas spring adjustment means brings the source valve into the open state, brings the spring switching valve and the vehicle height adjustment valve corresponding to the wheel for which the vehicle height adjustment is completed into the closed state, and bring the bypass valve into the open state, thereby causing the second gas spring and the working fluid supply/discharge device to communicate to each other to adjust the hydraulic pressure of the second gas spring so that the hydraulic pressure of the second gas spring is equal to the hydraulic pressure stored in the hydraulic pressure storage means. Thus, subsequently, even when the spring switching valve is opened and the hydraulic cylinder and the second gas spring thus communicate to each other in order to decrease the wheel rate, the hydraulic pressure variation in the hydraulic cylinder is not caused, and the vehicle height at the wheel can thus be prevented from changing.

In the description above, in order to facilitate understanding of the invention, reference symbols used in an embodiment of the present invention are enclosed in parentheses, and are assigned to each of constituent features of the invention corresponding to the embodiment. However, each of the constituent features of the invention is not limited to the embodiment prescribed by the reference symbols.

DESCRIPTION OF THE EMBODIMENTS

Figure 1:
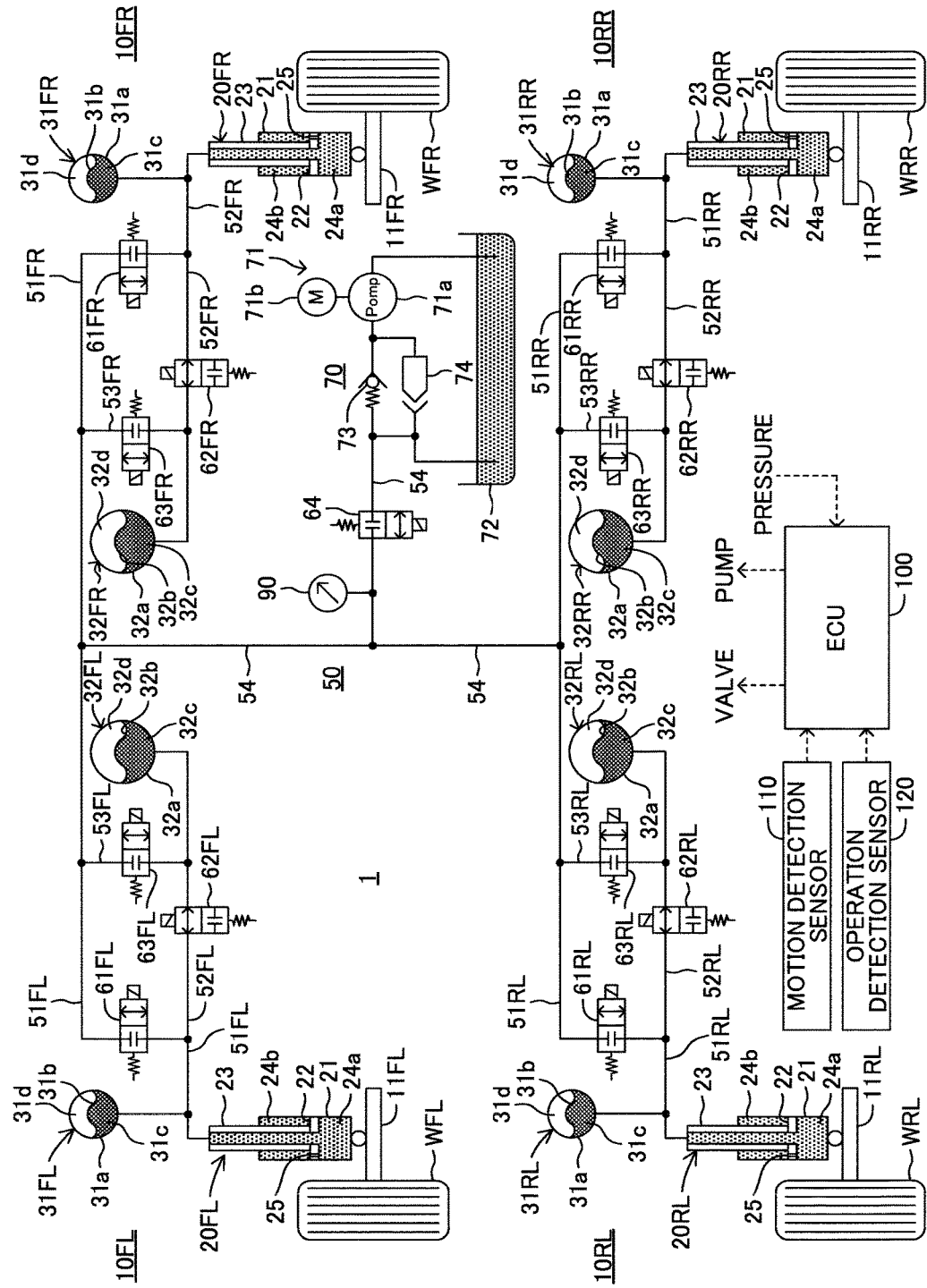
FIG. 1 is an overall configuration diagram for illustrating an outline of a suspension system according to an embodiment of the present invention.

A detailed description is now given of an embodiment of the present invention referring to drawings. FIG. 1 is an overall configuration diagram for illustrating an outline of a suspension system 1 according to this embodiment.

The suspension system 1 includes suspension devices 10FL, 10FR, 10RL, and 10RR for connecting/disconnecting between respective front/rear left/right wheels WFL, WFR, WRL, and WRR and the vehicle body, a working fluid supply/discharge device 70 for supplying/discharging working fluid to/from the suspension devices 10FL, 10FR, 10RL, and 10RR for adjusting a vehicle height, a hydraulic pressure control circuit 50 provided between the suspension devices 10FL, 10FR, 10RL, and 10RR and the working fluid supply/discharge device 70, and an electronic control unit 100 (referred to as ECU 100) for controlling an operation of the entire system.

In the following, regarding suffixes added to reference numerals, FL represents a member provided so as to correspond to the front left wheel; FR, front right wheel; RL, rear left wheel; and RR, rear right wheel. In this description, when it is not necessary to specify a corresponding wheel, the suffix is omitted.

The suspension device 10 includes a wheel holding member 11 (e.g., lower arm) for holding each of the front/rear left/right wheels W, and a hydraulic cylinder 20 provided between each of the wheel holding members 11 and the vehicle body. A suspension spring (coil spring) is provided in parallel with the hydraulic cylinder 20 between each of the wheel holding members 11 and the vehicle body, which is not shown. The hydraulic cylinder 20 functions as a shock absorber, and extends or contracts in response to a change in the distance between the wheel holding member 11 and the vehicle body.

The respective hydraulic cylinders 20 have the same structures as one another, and the hydraulic cylinder 20 includes a housing 21, a piston 22 fit inside the housing 21 for moving relatively to the housing 21, and a piston rod 23 extending from the piston 22 to the outside of the housing 21. The housing 21 is coupled to the wheel holding member 11, and the piston rod 23 is coupled to the vehicle body. The housing 21 is partitioned into two oil chambers 24a and 24b by the piston 22. Communication holes 25 are formed in the piston 22 for communication between the oil chambers 24a and 24b, and an orifice (not shown) is formed in the communication hole 25. This orifice generates a damping force depending on a movement speed of the piston 22 relative to the housing 21.

An individual supply/discharge passage 51, which is a passage through which the working fluid flows, is connected to the oil chamber 24a of each of the hydraulic cylinders 20. The hydraulic cylinder 20 is configured to use a pressure of the working fluid supplied from the individual supply/discharge passage 51 to generate a force toward a direction of separating the wheel holding member 11 and the vehicle body from each other. Thus, the hydraulic cylinder 20 increases the distance between the wheel holding member 11 and the vehicle body, thereby increasing the vehicle height as the pressure of the working fluid supplied from the individual supply/discharge passage 51 increases.

A main accumulator 31 and a leveling valve 61 are connected to the individual supply/discharge passage 51 in order of proximity to the hydraulic cylinder 20. The main accumulator 31 is configured to function as a gas spring in the hydraulic system provided independently of the suspension spring (coil spring).

The individual supply/discharge passage 51 corresponds to a vehicle height adjustment passage according to the present invention. The main accumulator 31 corresponds to a first gas spring according to the present invention. The leveling valve 61 corresponds to a vehicle height adjustment valve according to the present invention. Thus, a configuration constructed by the individual supply/discharge passage 51 and the leveling valve 61 corresponds to a vehicle height adjustment hydraulic pressure control circuit according to the present invention.

The main accumulator 31 includes a housing 31a and a partition member 31b for partitioning an inside of the housing 31a into two volume change chambers, and is constructed so that the individual supply/discharge passage 51 communicates to an oil chamber 31c, which is one volume change chamber partitioned by the partition member 31b, and a gas chamber 31d, which is another volume change chamber, is filled with gas (e.g., nitrogen gas), which is an elastic body. The volume of the gas chamber 31d decreases as the volume of the oil chamber 31c increases in the main accumulator 31. Thus, the main accumulator 31 functions as a gas spring in the hydraulic system for generating an elastic force for the extension or contraction operation of the hydraulic cylinder 20 as a result of a change in the amount of the working fluid stored in the oil chamber 31c in response to the hydraulic pressure in the hydraulic cylinder 20. The oil chamber 31c of the main accumulator 31 always communicates to the oil chamber 24a of the hydraulic cylinder 20.

The leveling valve 61 is a normally-closed electromagnetic on-off valve for operating during the vehicle height adjustment, thereby opening/closing the individual supply/discharge passage 51.

An individual rate switching passage 52 branches from and connects to a position between the leveling valve 61 and the hydraulic cylinder 20 of each of the individual supply/discharge passages 51. A spring switching valve 62 and a sub accumulator 32 are connected to the individual rate switching passage 52 in order of proximity to the connection position to the individual supply/discharge passage 51.

The sub accumulator 32 corresponds to a second gas spring according to the present invention.

The sub accumulator 32 includes a housing 32a and a partition member 32b for partitioning an inside of the housing 32a into two volume change chambers, and is constructed so that the individual supply/discharge passage 52 communicates to an oil chamber 32c, which is one volume change chamber partitioned by the partition member 32b, and a gas chamber 32d, which is another volume change chamber, is filled with gas (e.g., nitrogen gas), which is an elastic body. The volume of the gas chamber 32d decreases as the volume of the oil chamber 32c increases in the sub accumulator 32. Thus, the sub accumulator 32 functions as a gas spring in the hydraulic system for generating an elastic force for the extension or contraction operation of the hydraulic cylinder 20 as a result of a change in the amount of the working fluid stored in the oil chamber 32c in response to the hydraulic pressure in the hydraulic cylinder 20.

The sub accumulator 32 has a smaller spring constant than the main accumulator 31. An arbitrary type, e.g., a bellows type, a bladder type, and a piston type, can be employed for the main accumulator 31 and the sub accumulator 32. According to this embodiment, a metal bellows type accumulator having an excellent anti-gas permeability for the high compression pressure is employed for the main accumulator 31. Moreover, a bladder type accumulator incorporating a resin film that can secure a relatively large volume, and has an excellent anti-gas permeability is employed for the sub accumulator 32.

The spring switching valve 62 is a normally-open electromagnetic on-off valve for operating when the wheel rate is switched. When the spring switching valve 62 is open, the main accumulator 31 and the sub accumulator 32 are connected in parallel to the hydraulic cylinder 20. When the spring switching valve 62 is closed, the communication between the hydraulic cylinder 20 and the sub accumulator 32 is shut off (which can also be described as a state in which the communication between the main accumulator 31 and the sub accumulator 32 is shut off). In the following, the main accumulator 31 is referred to as a high gas spring 31, and the sub accumulator 32 is referred to as a low gas spring 32.

The suspension device 10 is constructed by the wheel holding member 11, the hydraulic cylinder 20, and the high gas spring 61 and the low gas spring 62 connected in parallel to the hydraulic cylinder 20 in this way.

Each of the individual supply/discharge passage 51 is connected to a common supply/discharge passage 54. The common supply/discharge passage 54 is connected to the working fluid supply/discharge device 70, and serves both as a passage for supplying the working fluid from the working fluid supply/discharge device 70 to the respective individual supply/discharge passages 51, and a passage for returning the working fluid from the respective individual supply/discharge passages 51 to the working fluid supply/discharge device 70.

A source valve 64, which is a normally-closed electromagnetic on-off valve, is provided on the common supply/discharge passage 54. Thus, each of the individual supply/discharge passages 51 and the working fluid supply/discharge device 70 communicate to each other only when the source valve 64 is open. The communication between each of the individual supply/discharge passages 51 and the working fluid supply/discharge device 70 is shut off when the source valve 64 is closed.

In FIG. 1, the common supply/discharge passage 54 branches on a downstream side of the source valve 64 to a passage communicating to the individual supply/discharge passages 51FL and 51FR for the front left and right wheels and a passage communicating to the individual supply/discharge passages 51RL and 51RR for the rear left and right wheels, but does not always need to branch in this manner. The passage (i.e., common supply/discharge passage 54) from the working fluid supply/discharge device 70 to the respective individual supply/discharge passages 51 may be arbitrarily constructed. For example, the passage may be constructed in such a way that the respective individual supply/discharge passages 51FL, 51FR, 51RL, and 51RR directly communicate to the common supply/discharge passage 54 common to the four wheels.

The common supply/discharge passage 54 corresponds to a supply/discharge source passage according to the present invention. This configuration constructed by the common supply/discharge passage 54 and the source valve 64 corresponds to a supply/discharge hydraulic pressure control circuit according to the present invention.

An individual bypass passage 53 for bypassing the leveling valve 61 and the spring switching valve 62, thereby causing the low gas spring 32 to communicate to the common supply/discharge passage 54 is provided in the hydraulic pressure control circuit 50. A bypass valve 63 is provided on each of the individual bypass passages 53. This bypass valve 63 is a normally-closed electromagnetic on-off valve. Thus, the low gas spring 32 communicates to the common supply/discharge passage 54 when the bypass valve 63 is opened regardless of the states of the leveling valve 61 and the spring switching valve 62. This configuration constructed by the individual bypass valve passage 53 and the bypass valve 63 corresponds to a second gas spring hydraulic pressure control circuit according to the present invention.

The working fluid supply/discharge device 70 includes a pump device 71 serving as a high pressure source, and a reservoir tank 72 serving as a low pressure source. The pump device 71 includes a pump 71a, and a pump motor 71b for driving the pump 71a. The pump device 71 is configured to pump the working fluid in the reservoir tank 72, and supply the working fluid to the common supply/discharge passage 54. The working fluid supply/discharge device 70 includes a check valve 73 and a return valve 74 in parallel with each other at a position on the common supply/discharge passage 54 downstream of the pump device 71 and upstream of the source valve 64.

The return valve 74 is a valve for switching between the supply of the working fluid from the pump device 71 to the source valve 64 and the discharge of the working fluid from the source valve 64 to the reservoir tank 72. The return valve 74 is configured to normally be in a state in which a passage between the source valve 64 and the reservoir tank 72 is opened by a force of a spring, and shut off the passage between the source valve 64 and the reservoir tank 72 when the pump device 71 is driven and a valve body of the return valve 74 is thus pushed by a differential pressure between a discharge pressure of the pump device 71 and the hydraulic pressure in the common supply/discharge passage 54. As a result, the check valve 73 opens, and the working fluid discharged from the pump device 71 flows to the source valve 64 in the open state.

Moreover, a pressure sensor 90 for detecting the hydraulic pressure downstream of the source valve 64 is provided on the common supply/discharge passage 54.

The hydraulic pressure control circuit 50 includes the common supply/discharge passage 54, the source valve 64, the individual supply/discharge passages 51, the leveling valves 61, the individual rate switching passages 52, the spring switching valves 62, the individual bypass passages 53, and the bypass valves 63 in this way.

The ECU 100 includes a microcomputer and drive circuits (motor drive circuit and electromagnetic valve drive circuit) as principal components. The microcomputer herein includes a CPU and storage devices such as a ROM and a RAM, and the CPU is configured to realize various functions by executing instructions (programs) stored in the ROM.

The various electromagnetic valves (the leveling valves 61, the spring switching valves 62, the bypass valves 63, and the source valve 64) provided on the hydraulic pressure control circuit 50, and the pump motor 71b and the pressure sensor 90 provided in the working fluid supply/discharge device 70 are connected to the ECU 100. Further, a motion detection sensor 110 for detecting a vehicle motion state and an operation detection sensor 120 for detecting operations of a driver are connected to the ECU 100.

As the motion detection sensor 110, for example, there are provided a vehicle speed sensor for detecting a vehicle speed, vehicle height sensors for detecting vehicle heights respectively at the front/rear left/right wheel positions, a vertical acceleration sensor for detecting an acceleration in the vertical direction of the vehicle body, a yaw rate sensor for detecting a yaw rate of the vehicle body, a horizontal acceleration sensor for detecting an acceleration in the longitudinal/lateral directions of the vehicle body, and the like. The vehicle height sensor is configured to detect a distance between the wheel holding member 11 for holding each of the wheels W and the vehicle body at the wheel position as the vehicle height.

As the operation detection sensor 120, there are provided a stroke sensor for detecting a depression stroke of a brake pedal, a steering angle sensor for detecting a steering angle of a steering wheel, a transfer sensor for detecting a range state of a transfer, and the like. The ECU 100 does not need to directly connect to the motion detection sensor 110 and the operation detection sensor 120, and may input detection signals from other in-vehicle ECUs (e.g., an engine ECU, a brake ECU, and a steering ECU) connected to those sensors. Moreover, the ECU 100 connects to a vehicle height selection switch and a vehicle height adjustment off switch as the operation detection sensor 120.

The vehicle height selection switch is a switch for selecting a target vehicle height from a plurality of vehicle heights, e.g., a normal vehicle height, a low vehicle height, and a high vehicle height. The vehicle height adjustment off switch is a switch for inhibiting the vehicle height control by the operation of the driver.

The ECU 100 is configured to carry out the vehicle height control and the wheel rate switching control based on the detection signals detected by the motion detection sensor 110 and the operation detection sensor 120.

The ECU 100 is configured to control the working fluid supply/discharge device 70 and the various electromagnetic valves 61, 62, 63, and 64 based on the vehicle height selected by the vehicle height selection switch and the signals detected by the motion detection sensor 110 and the operation detection sensor 120, thereby switching the supply, the discharge, and the holding of the working fluid for the respective hydraulic cylinders 20 for the front/rear left/right wheels W to adjust the vehicle height.

For example, the ECU 100 carries out auto leveling control of always maintaining the vehicle height selected by the driver independently of a load state, e.g., the number of passengers and a carried load amount. Moreover, the ECU 100 has a function of setting an optimal target vehicle height depending on the vehicle speed. For example, the ECU 100 is configured to reset the vehicle height selected by the driver, and change the target vehicle height to the normal vehicle height when the low vehicle height or the high vehicle height is selected through the switch operation by the driver and the vehicle speed becomes more than a threshold set in advance. Moreover, the ECU 100 is configured to reset the vehicle height selected by the driver, and change the target vehicle height to a low vehicle height for high speed travel set in advance during the high speed travel. Moreover, the ECU 100 is configured to switch the target vehicle height to the high vehicle height when the setting of the transfer detected by the transfer sensor is an L4 range (range for off-road travel) and the vehicle speed becomes equal to or more than a vehicle speed set in advance.

The ECU 100 is configured to control the working fluid supply/discharge device 70 and the various electromagnetic valves 61, 62, 63, and 64 so that the vehicle heights (actual vehicle heights) detected by the vehicle height sensors respectively match target vehicle heights.

Figure 2:
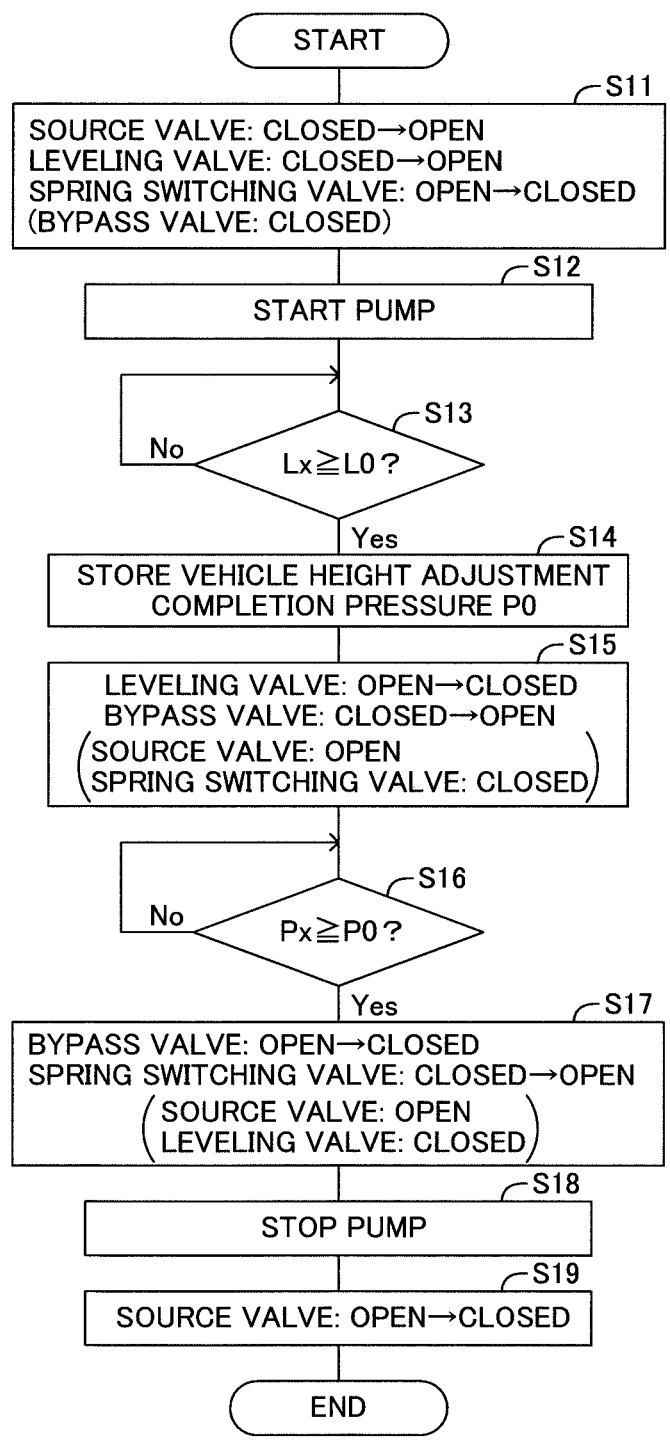
FIG. 2 is a flowchart for illustrating a vehicle height increase control routine.

The ECU 100 adjusts the vehicle height as described below when the vehicle heights need to be changed. First, a description is given of control when the vehicle heights are increased. On this occasion, a description is given of the vehicle height control for one wheel. FIG. 2 is a flowchart for illustrating a vehicle height increase control routine to be executed by the notification ECU 100. When a vehicle height increase request is generated, the ECU 100 starts the vehicle height increase control routine.

When the vehicle height increase control routine is started, in Step S11, the ECU 100 switches the source valve 64 and the leveling valve 61 from the closed state to the open state, and switches the spring switching valve 62 from the open state to the closed state while the bypass valve 63 is maintained in the closed state.

Then, in Step S12, the ECU 100 starts the pump device 71. As a result, the working fluid stored in the reservoir tank 72 is supplied to the hydraulic cylinder 20 and the high gas spring 31 via the hydraulic pressure control circuit 50. Consequently, the vehicle height increases at the wheel W. In this case, the working fluid is not supplied to the low gas spring 32, and the vehicle height can be increased quickly by using a small amount of the fluid.

In Step S13, the ECU 100 waits until a vehicle height Lx (hereinafter referred to as actual vehicle height Lx) detected by the vehicle height sensor reaches a target vehicle height L0. When the actual vehicle height Lx reaches the target vehicle height L0 (Yes in Step S13), in Step S14, the ECU 100 stores a detection value of the pressure sensor 90 at this time point as a vehicle height adjustment completion pressure P0. This vehicle height adjustment completion pressure P0 is equal to the hydraulic pressure in the hydraulic cylinder 20 and the high gas spring 31 for the vehicle height adjustment subject wheel.

Then, in Step S15, the ECU 100 switches the leveling valve 61 from the open state to the closed state, and switches the bypass valve 63 from the closed state to the open state while maintaining the open/close states of the source valve 64 and the spring switching valve 62. As a result, the working fluid stored in the reservoir tank 72 is supplied to the low gas spring 32 via the source valve 64 and the bypass valve 63 under the state in which the hydraulic pressure in the hydraulic cylinder 20 and the high gas spring 31 is maintained.

Then, in Step S16, the ECU 100 waits until a detection value Px (referred to as actual hydraulic pressure Px) of the pressure sensor 90 reaches the vehicle height adjustment completion pressure P0. In other words, the ECU 100 waits until the hydraulic pressure in the low gas spring 32 becomes equal to the hydraulic pressure in the hydraulic cylinder 20 and the high gas spring 31 for the wheel W.

When the actual hydraulic pressure Px reaches the vehicle height adjustment completion pressure P0 (Yes in Step S16), in Step S17, the ECU 100 switches the bypass valve 63 from the open state to the closed state, and switches the spring switching valve 62 from the closed state to the open state while maintaining the open/closed states of the source valve 64 and the leveling valve 61. As a result, the hydraulic cylinder 20, the high gas spring 31, and the low gas spring 32 are brought into the mutual communication state.

Then, in Step S18, the ECU 100 stops the operation of the pump device 71. As a result, the pressure in the common supply/discharge passage 54 decreases to a pressure approximately equal to the atmospheric pressure. Then, in Step S19, the ECU 100 switches the source valve 64 from the open state to the closed state, and finishes this routine.

With this vehicle height increase control routine, when the vehicle height is increased, the working fluid is not supplied to the low gas spring 32, the working fluid is supplied to the low gas spring 32 after the vehicle height increases to the target vehicle height, and the amount of the fluid required to increase the vehicle height can be minimized. Moreover, the vehicle height can be increased quickly to the target vehicle height. Moreover, after the vehicle height increases to the target vehicle height, the working fluid is supplied to the low gas spring 32 so that the low gas spring 32 and the high gas spring 31 have the same pressure, and a vehicle height variation caused by the opening operation of the spring switching valve 62 can be prevented.

When the vehicle heights are simultaneously increased for the four wheels, the ECU 100 starts the processing in Step S11 simultaneously for the four wheels (opening operation of the source valve 64 is common), and, when the actual vehicle height Lx reaches the target vehicle height L0 for each of the wheels W, stores the vehicle height adjustment completion pressure P0, and closes the leveling valve 61. After the actual vehicle heights Lx reach the target vehicle heights L0 for all of the four wheels, the ECU 100 only needs to open the bypass valve 63 for each of the wheels, and supply the working fluid to the low gas spring 32 until the actual hydraulic pressure Px reaches the vehicle height adjustment completion pressure P0.

Figure 3:
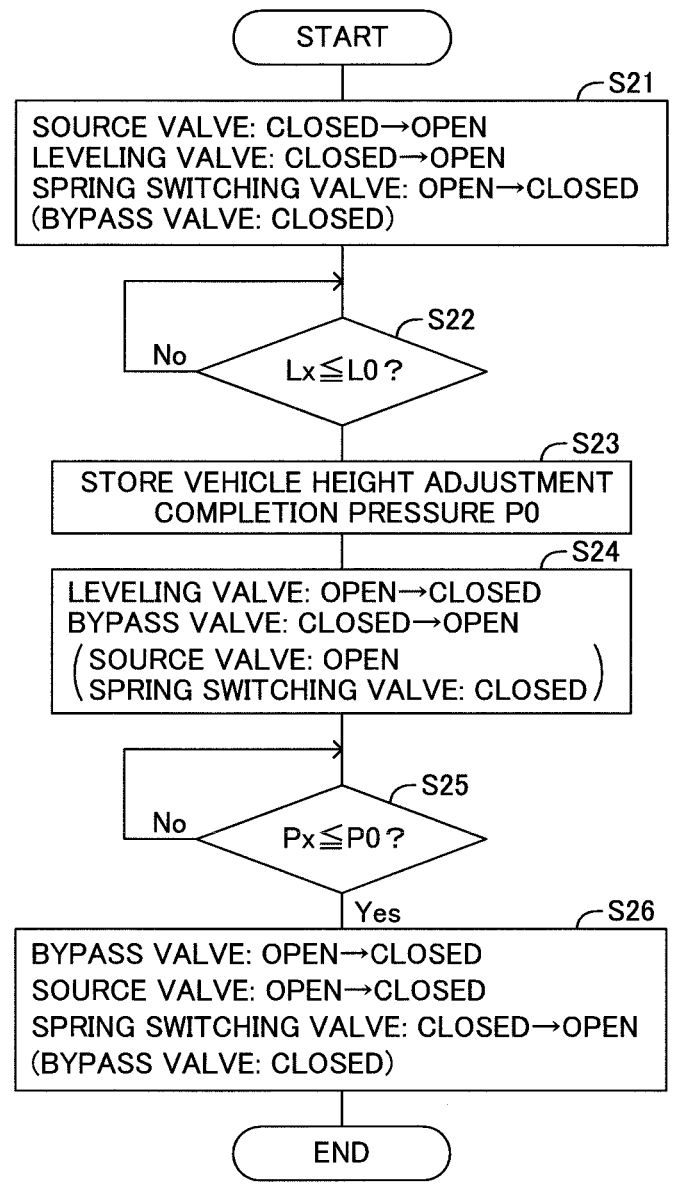
FIG. 3 is a flowchart for illustrating a vehicle height decrease control routine.

Next, a description is given of control when the vehicle heights are decreased. On this occasion, a description is given of the vehicle height control for one wheel. FIG. 3 is a flowchart for illustrating a vehicle height decrease control routine executed by the notification ECU 100. When a vehicle height decrease request is generated, the ECU 100 starts the vehicle height decrease control routine.

When the vehicle height decrease control routine is started, in Step S21, under the state in which the operation of the pump device 71 is stopped, the ECU 100 switches the source valve 64 and the leveling valve 61 from the closed state to the open state, and switches the spring switching valve 62 from the open state to the closed state while the bypass valve 63 is maintained in the closed state.

As a result, the working fluid in the hydraulic cylinder 20 and the high gas spring 31 is discharged to the reservoir tank 72 via the hydraulic pressure control circuit 50. Thus, the hydraulic cylinder 20 contracts, and the vehicle height at the wheel W decreases. Next, in Step S22, the ECU 100 waits until the actual vehicle height Lx detected by the vehicle height sensor reaches the target vehicle height L0. When the actual vehicle height Lx reaches the target vehicle height L0 (Yes in Step S22), in Step S23, the ECU 100 stores a detection value of the pressure sensor 90 at this time point as the vehicle height adjustment completion pressure P0. This vehicle height adjustment completion pressure P0 is equal to the hydraulic pressure in the hydraulic cylinder 20 and the high gas spring 31 for the vehicle height adjustment subject wheel.

Then, in Step S24, the ECU 100 switches the leveling valve 61 from the open state to the closed state, and switches the bypass valve 63 from the closed state to the open state while maintaining the open state of the source valve 64 and the closed state of the spring switching valve 62. As a result, the hydraulic pressure in the low gas spring 32 decreases. In Step S25, the ECU 100 waits until the actual hydraulic pressure Px detected by the pressure sensor 90 decreases to the vehicle height adjustment completion pressure P0 stored in Step S23. In other words, the ECU 100 waits until the hydraulic pressure in the low gas spring 32 becomes equal to the hydraulic pressure in the hydraulic cylinder 20 and the high gas spring 31 for the wheel W.

When the actual hydraulic pressure Px reaches the vehicle height adjustment completion pressure P0 (Yes in Step S25), in Step S26, the ECU 100 switches the bypass valve 63 and the source valve 64 from the open state to the closed state, switches the spring switching valve 62 from the closed state to the open state while maintaining the leveling valve 61 in the closed state, and finishes this routine. As a result, the hydraulic cylinder 20, the high gas spring 31, and the low gas spring 32 are brought into the mutual communication state.

With this vehicle height decrease control routine, the working fluid is discharged from the hydraulic cylinder 20 and the high gas spring 31 while the communication to the low gas spring 32 is shut off to decrease the vehicle height to the target vehicle height, thereby being capable quickly decreasing the vehicle height to the target vehicle height. Moreover, after the vehicle height has decreased to the target vehicle height, the hydraulic pressure in the low gas spring 32 is adjusted so that the low gas spring 32 and the high gas spring 31 have the same pressure, and the vehicle height variation caused by the opening operation of the spring switching valve 62 can be prevented.

When the vehicle heights are simultaneously decreased for the four wheels, the ECU 100 starts the processing in Step S21 simultaneously for the four wheels, and, when the actual vehicle height Lx reaches the target vehicle height L0 for each of the wheels W, stores the vehicle height adjustment completion pressure P0, and closes the leveling valve 61. After the actual vehicle heights Lx reach the target vehicle heights L0 for all of the four wheels, the ECU 100 only needs to open the bypass valve 63 for each of the wheels, and decrease the hydraulic pressure of the low gas spring 32 until the actual hydraulic pressure Px reaches the vehicle height adjustment completion pressure P0.

When the ECU 100 adjusts the vehicle height through the hydraulic pressure, the ECU 100 always adjusts the hydraulic pressure in the low gas spring 32 so as to be equal to the hydraulic pressure in the hydraulic cylinder 20 (=hydraulic pressure in the high gas spring 31) during the vehicle height adjustment, thereby preventing the vehicle height variation caused by the opening operation of the spring switching valve 62 in this way.

A description is now given of wheel rate switching control carried out by the ECU 100. In the suspension system 1 according to this embodiment, the wheel rate of each of the wheels W can be switched by switching between the communication and the shutoff between the low gas spring 32 and the hydraulic cylinder 20 at the wheel position for each of the wheels W. In other words, the wheel rate can be switched between small (soft) and large (hard) by using the open/close control for the spring switching valve 62 to switch the communication state/shutoff state between the hydraulic cylinder 20 and the low gas spring 32 (which can also be described as the communication state/shutoff state between the high gas spring 31 and the low gas spring 32).

For example, the ECU 100 is configured to basically maintain the spring switching valves 62 for the four wheels in the open state so as to set the wheel rates to be small (soft), thereby securing ride comfort. Moreover, when a change in an attitude of the vehicle body, e.g., a roll motion during a vehicle turn or a pitch motion during a vehicle braking, is detected (or predicted) by the motion detection sensor 110 and the operation detection sensor 120, the ECU 100 opens the spring switching valves 62 for the wheels W (e.g., front left and right wheel) depending on the attitude change state so as to disconnect the low gas springs 32 from the hydraulic cylinders 20 for the corresponding wheels W, thereby increasing the wheel rates (hard). As a result, the roll motion and the pitch motion (attitude changes in the vehicle body) of the vehicle body can be suppressed.

The switching of the wheel rate is carried out by switching the communication state/shutoff state between the hydraulic cylinder 20 and the low gas spring 32 for each of the wheels W as a unit, and the extent of the change in the wheel rate cannot be increased any more. For example, in order to travel off road, it is important to decrease the roll stiffness, thereby increasing the wheel articulation of each of the wheels W so that the wheel W is always in contact with the ground. To achieve this, it is only necessary to decrease the wheel rate as much as possible, thereby promoting a stroke displacement of the wheel W.

Figure 4:
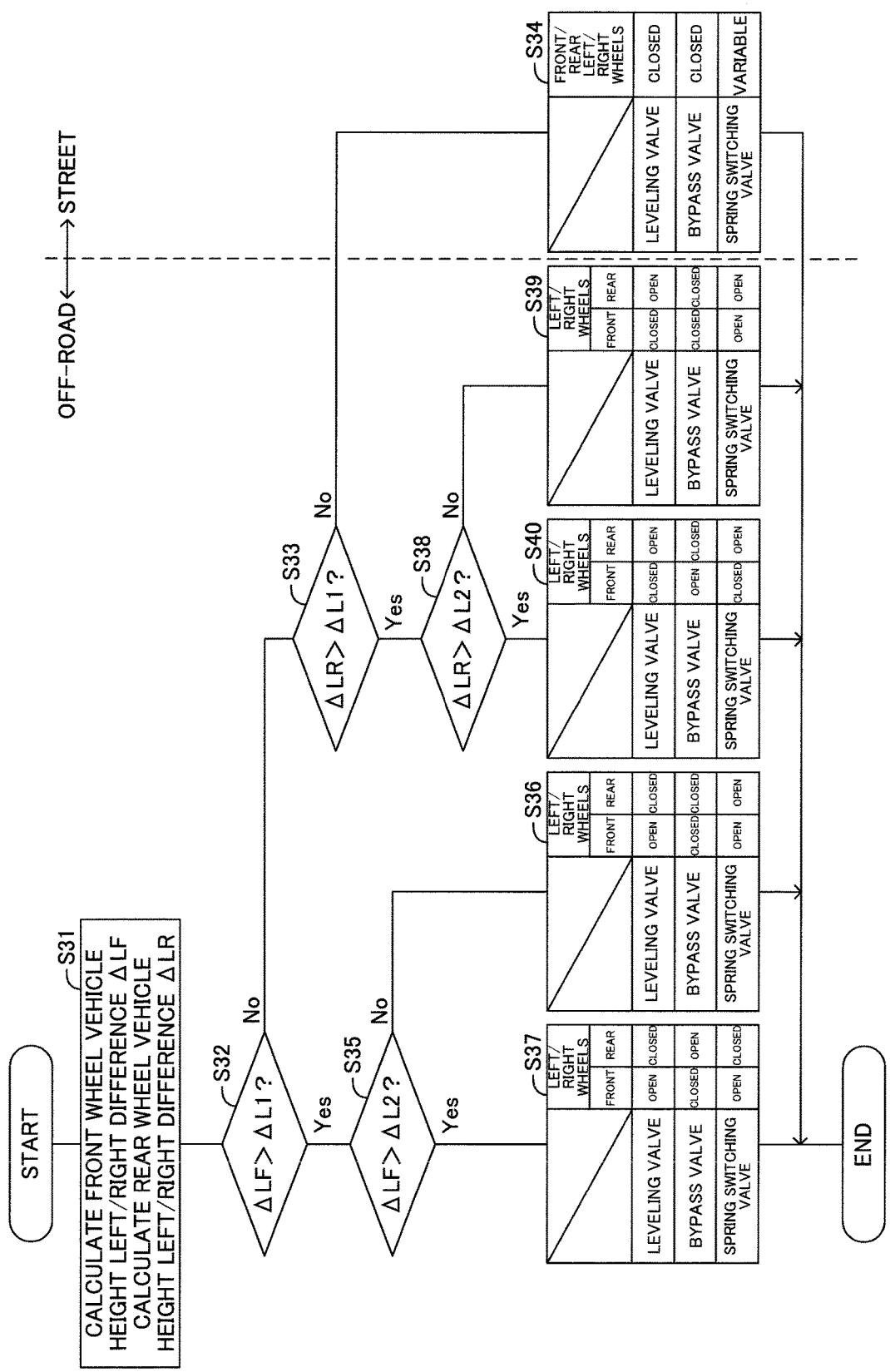
FIG. 4 is a flowchart for illustrating a wheel rate switching control routine.

Thus, the ECU 100 is configured to carry out switching control for the wheel rate as described below. FIG. 4 is a flowchart for illustrating a wheel rate switching control routine executed by the ECU 100. The ECU 100 is configured to repeatedly execute the wheel rate switching control routine at a predetermined short calculation cycle while the ignition switch is on. The wheel rate switching control routine is carried out while the above-mentioned vehicle height control routine is not carried out. Thus, when the wheel rate switching control routine is carried out, the source valve 64 is maintained in the closed state, and the pump device 71 is not in operation.

When this routine is started, in Step S31, the ECU 100 calculates the front wheel vehicle height left/right difference ΔLF and the rear wheel vehicle height left/right difference ΔLR. The front wheel vehicle height left/right difference ΔLF is an absolute value |LFL-LFR| of a difference between the front left wheel vehicle height LFL detected by the vehicle height sensor for the front left wheel WFL and the front right wheel vehicle height LFR detected by the vehicle height sensor for the front right wheel WFR. The rear wheel vehicle height left/right difference ΔLR is an absolute value |LRL-LRR| of a difference between the rear left wheel vehicle height LRL detected by the vehicle height sensor for the rear left wheel WRL and the rear right wheel vehicle height LRR detected by the vehicle height sensor for the rear right wheel WRR.

Then, in Step S32, the ECU 100 determines whether or not the front wheel vehicle height left/right difference ΔLF is more than a first rough road determination threshold ΔL1. When the front wheel vehicle height left/right difference ΔLF is equal to or less than the first rough road determination threshold ΔL1 (No in Step S32), the ECU 100 advances its processing to Step S33, and determines whether or not the rear wheel vehicle height left/right difference ΔLR is more than the first rough road determination threshold ΔL1. The first rough road determination threshold ΔL1 is set to be such a large value as not to be detected during travel on a normal road. In other words, the first rough road determination threshold ΔL1 is set to be such a large value as to be detected only during the off-road travel.

When the rear wheel vehicle height left/right difference ΔLR is equal to or less than the first rough road determination threshold ΔL1 (No in Step S33), the ECU 100 advances its processing to Step S34 and carries out street travel switching control. The street travel switching control maintains the leveling valves 61 and the bypass valves 63 for the front/rear left/right wheels W in the closed state, sets the spring switching valves 62 to the open state (soft) when the ride comfort needs to be focused on, and sets the spring switching valves 62 to the closed state (hard) for the wheels W effective for the suppression of the attitude change when the attitude change (pitch and roll) of the vehicle body needs to be suppressed.

Figure 5:
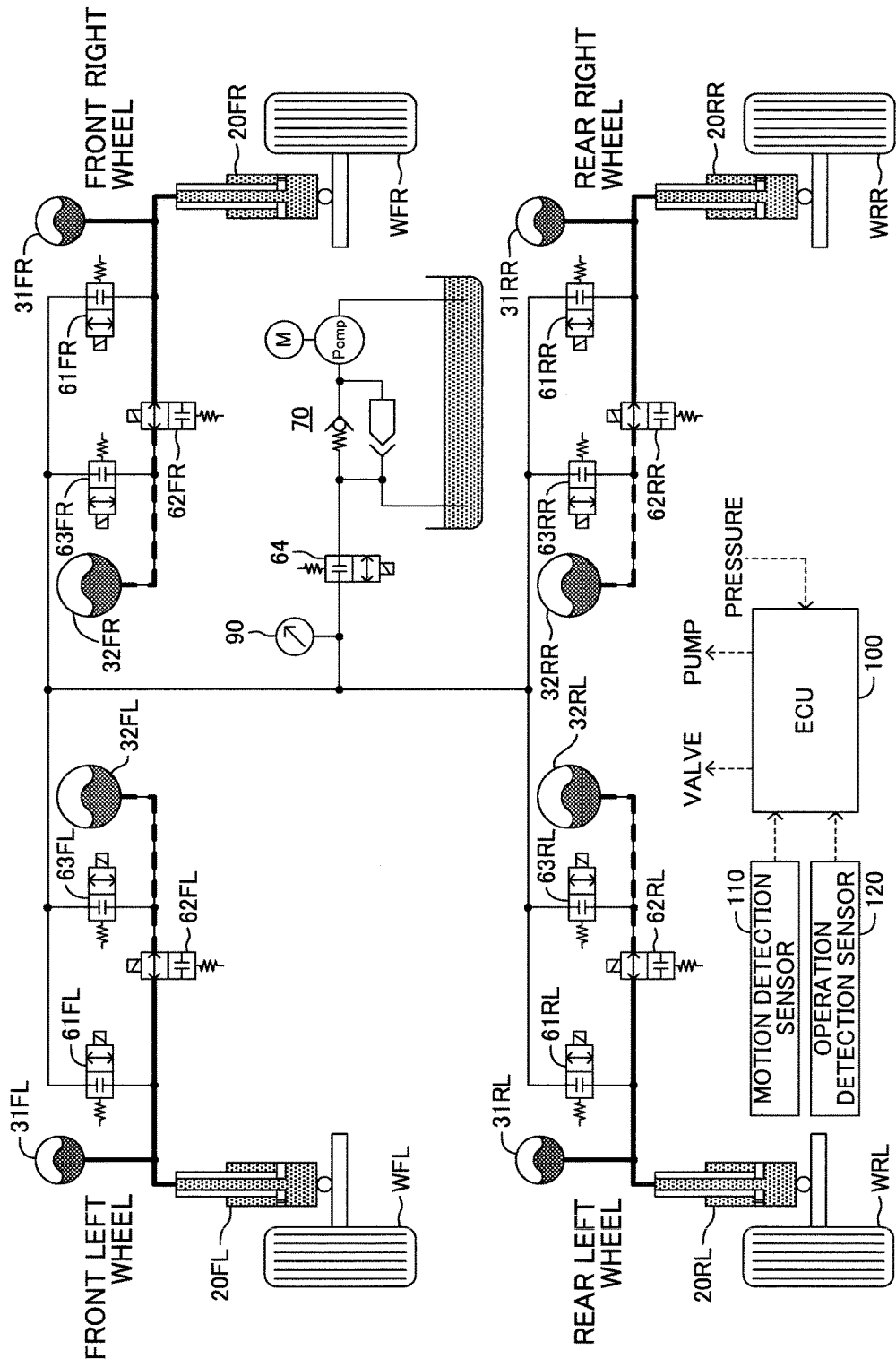
FIG. 5 is an explanatory diagram for illustrating a communication state/a shut-off state between a hydraulic cylinder and a low gas spring.

When the vehicle is not traveling off road, those pieces of processing are repeated. As illustrated in FIG. 5, the respective hydraulic cylinders 20 for the front/rear left/right wheels W do not communicate to one another in this state, and thus independently (regardless of the hydraulic pressure variations by the extension/contraction of the hydraulic cylinders 20 for other wheels) carry out an extension/contraction operation in accordance with the road surface. In FIG. 5 and FIG. 6 to FIG. 9 described later, the thick lines represent flow passages through which the working fluid can flow.

In Step S32, when the ECU 100 makes a determination of "Yes", meaning that the front wheel vehicle height left/right difference ΔLF is more than the first rough road determination threshold ΔL1, the ECU 100 advances its processing to Step S35, and determines whether or not the front wheel vehicle height left/right difference ΔLF is more than a second rough road determination threshold ΔL2. The second rough road determination threshold ΔL2 is set to a value more than the first rough road determination threshold ΔL1.

When the ECU 100 determines that the front wheel vehicle height left/right difference ΔLF is more than the first rough road determination threshold ΔL1, and is equal to or less than the second rough road determination threshold ΔL2 (No in Step S35), the ECU 100 advances its processing to Step S36. In Step S36, the ECU 100 brings the leveling valves 61FL and 61FR for the front left and right wheels WFL and WFR into the open state. In this case, the leveling valves 61RL and 61RR (normally-closed electromagnetic valves) for the rear left/right wheels WRL and WRR are maintained in the closed state, the bypass valves 63FL, 63FR, 63RL, and 63RR (normally-closed electromagnetic valves) for the front/rear left/right wheels are maintained in the closed state, and the spring switching valves 62FL, 62FR, 62RL, and 62RR (normally-opened electromagnetic valves) for the front/rear left/right wheels are maintained in the open state.

The roll stiffness only needs to be decreased, thereby increasing the wheel articulation (wheel stroke amounts) during the off-road travel. For example, when one of the left/right wheels runs over a protruded road surface, the wheel on the protruded road surface is smoothly pulled toward the vehicle body in response to the wheel pushed up by the protruded road surface, and another of the left and right wheels is stroked simultaneously so as to be pushed down toward the road surface to increase its stroke displacement, thereby increasing the road holding property of the wheels and improving the off-road travel performance.

Figure 6:
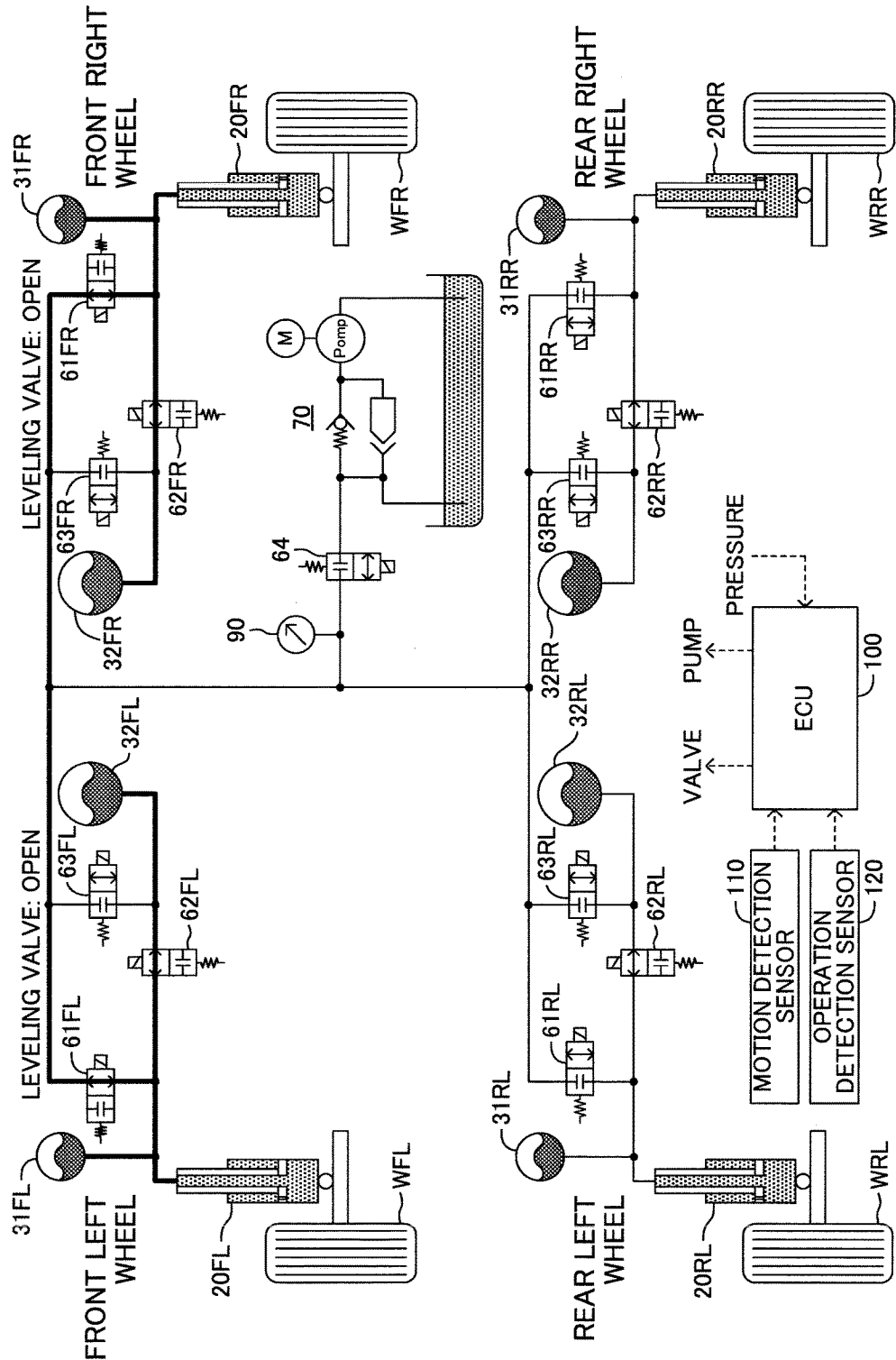
FIG. 6 is an explanatory diagram for illustrating a communication state between hydraulic cylinders for front left/right wheels.

Thus, in Step S36, the ECU 100 opens the leveling valves 61FL and 61FR for the front left and right wheels WFL and WFR, thereby causing, as illustrated in FIG. 6, the hydraulic cylinders 20FL and 20FR for the front left and right wheels WFL and WFR (including the high gas springs and the low gas springs) to communicate to each other. Thus, the working fluid in the hydraulic cylinder 20 operating in the contraction direction for the one of the front left and right wheels can be moved to the hydraulic cylinder 20 for the another of the front left and right wheels.

As a result, a force received from the road surface by the hydraulic cylinder 20 of the one of the front left and right wheels, and acting as the contraction operation in the roll stiffness decrease subject wheels can be used as a force acting as an extension operation of the hydraulic cylinder 20 for the another of the front left and right wheels. Thus, the wheel articulation of each of the front left and right wheels WFL and WFR increases, and the another of the front left and right wheels can thus be prevented from being lifted from the road surface (road holding property can be improved).

When those pieces of processing are repeated, and the front wheel vehicle height left/right difference ΔLF becomes more than the second rough road determination threshold ΔL2 (Yes in Step S35), the ECU 100 advances the processing to Step S37, brings the bypass valve 63RL and 63RR for the rear left and right wheels WRL and WRR into the open state, and brings the spring switching valves 62RL and 62RR into the closed state. In this case, the open/closed states of the respective valves for the front left and right wheels WFL and WFR are the same as those in Step S36.

Figure 7:
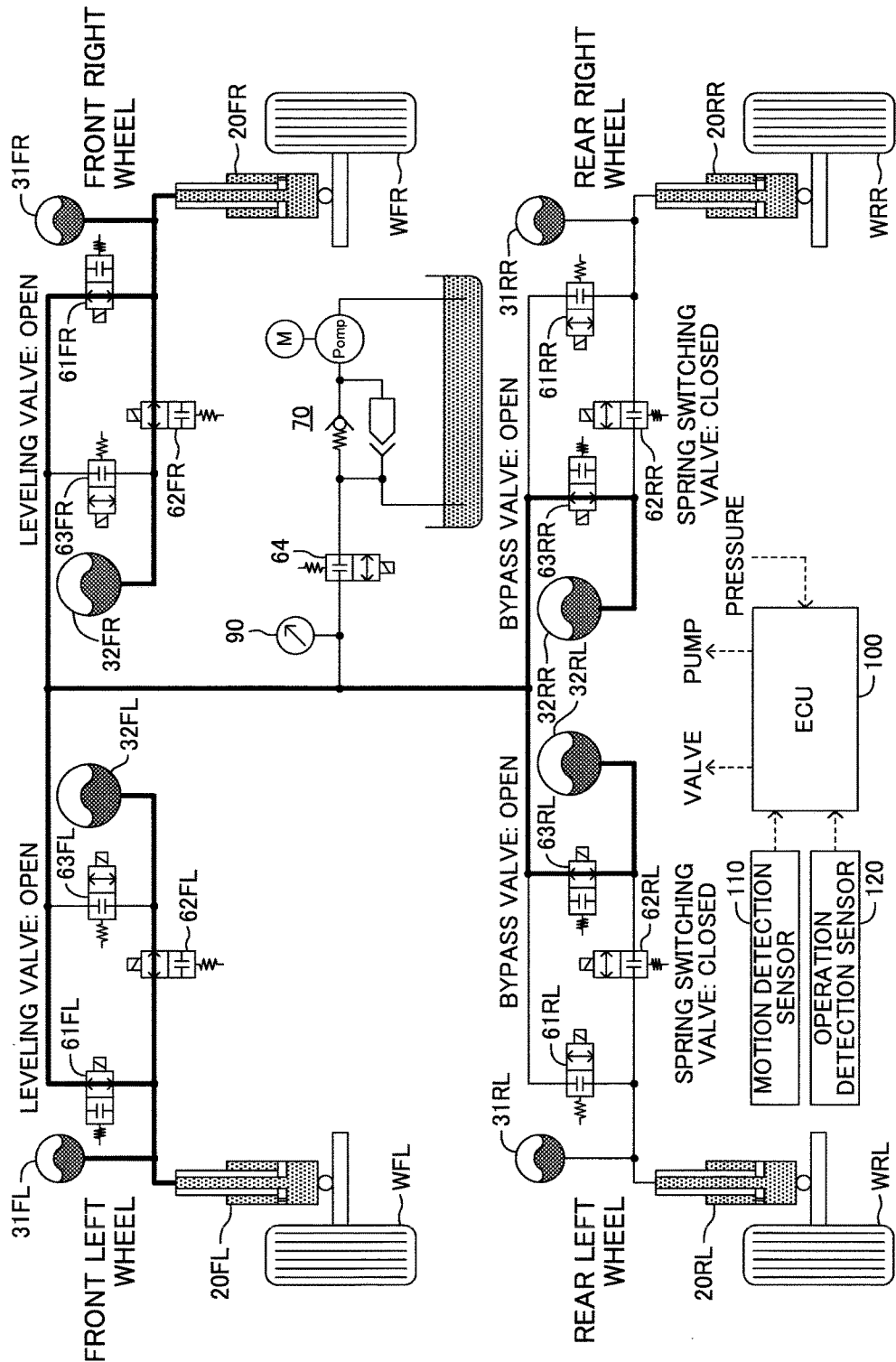
FIG. 7 is an explanatory diagram for illustrating a communication state of the hydraulic cylinders for the front left/right wheels and the low gas springs for the rear left/right wheels.

Thus, as illustrated in FIG. 7, in addition to the two high gas springs 31FL and 31FR and the two low gas springs 32FL and 32FR for the front left and right wheels WFL and WFR that have been in communication, the two low gas springs 32RL and 32RR for the rear left and right wheels WRL and WRR are caused to communicate to the hydraulic cylinders 20FL and 20FR for the front left and right wheels WFL and WFR. In this case, the hydraulic cylinders 20RL and 20RR and the high gas springs 31RL and 31RR for the rear left and right wheels WRL and WRR do not communicate to the hydraulic cylinders 20FL and 20FR for the front left and right wheels WFL and WFR.

Thus, through increase of the number of gas springs communicating to the hydraulic cylinders 20FL and 20FR for the front left and right wheels WFL and WFR, the wheel rates of the front left and right wheels WFL and WFR decrease. In other words, a hydraulic pressure absorption capacity of the gas springs communicating to each of the hydraulic cylinders 20FL and 20FR for the front left and right wheels WFL and WFR can be increased more than the hydraulic pressure absorption capacity of the gas springs provided for each of the wheels, thereby further decreasing the wheel rates. As a result, the roll stiffness of each of the front left and right wheels WFL and WFR can further be decreased, thereby increasing the wheel articulation of each of the front left and right wheels WFL and WFR. As a result, the road holding property of each of the front left and right wheels WFL and WFR can further be increased.

Moreover, when the low gas springs 32RL and 32RR for the rear left and right wheels WRL and WRR are caused to communicate to the hydraulic cylinders 20FL and 20FR for the front left and right wheels WFL and WFR, the bypass valves 63RL and 63RR for the rear left and right wheels WRL and WRR are opened while the spring switching valves 62RL and 62RR for the rear left and right wheels WRL and WRR are closed, and the hydraulic pressure variation in the hydraulic cylinders 20RL and 20RR for the rear left and right wheels WRL and WRR caused by the opening operation is thus not induced. Thus, the vehicle heights at the rear left and right wheels WRL and WRR can be prevented from changing. As a result, the vehicle body can be prevented from inclining in the longitudinal direction.

Moreover, when, in Step S33, a determination of "Yes" is made, meaning that the front wheel vehicle height left/right difference ΔLF is equal to or less than the first rough road determination threshold ΔL1 and the rear wheel vehicle height left/right difference ΔLR is equal to or more than the first rough road determination threshold ΔL1, the ECU 100 advances its processing to Step S38. Then, in Step S38, the ECU 100 determines whether or not the rear wheel vehicle height left/right difference ΔLR is more than the second rough road determination threshold ΔL2.

When the ECU 100 determines that the front wheel vehicle height left/right difference ΔLR is more than the first rough road determination threshold ΔL1, and is equal to or less than the second rough road determination threshold ΔL2 (No in Step S38), the ECU 100 advances its processing to Step S39. In Step S39, the ECU 100 brings the leveling valves 61RL and 61RR for the rear left and right wheels WRL and WRR into the open state. In this case, the leveling valves 61FL and 61FR (normally-closed electromagnetic valves) for the front left/right wheels WFL and WFR are maintained in the closed state, the bypass valves 63FL, 63FR, 63RL, and 63RR (normally-closed electromagnetic valves) for the front/rear left/right wheels are maintained in the closed state, and the spring switching valves 62FL, 62FR, 62RL, and 62RR (normally-opened electromagnetic valves) for the front/rear left/right wheels are maintained in the open state.

Figure 8:
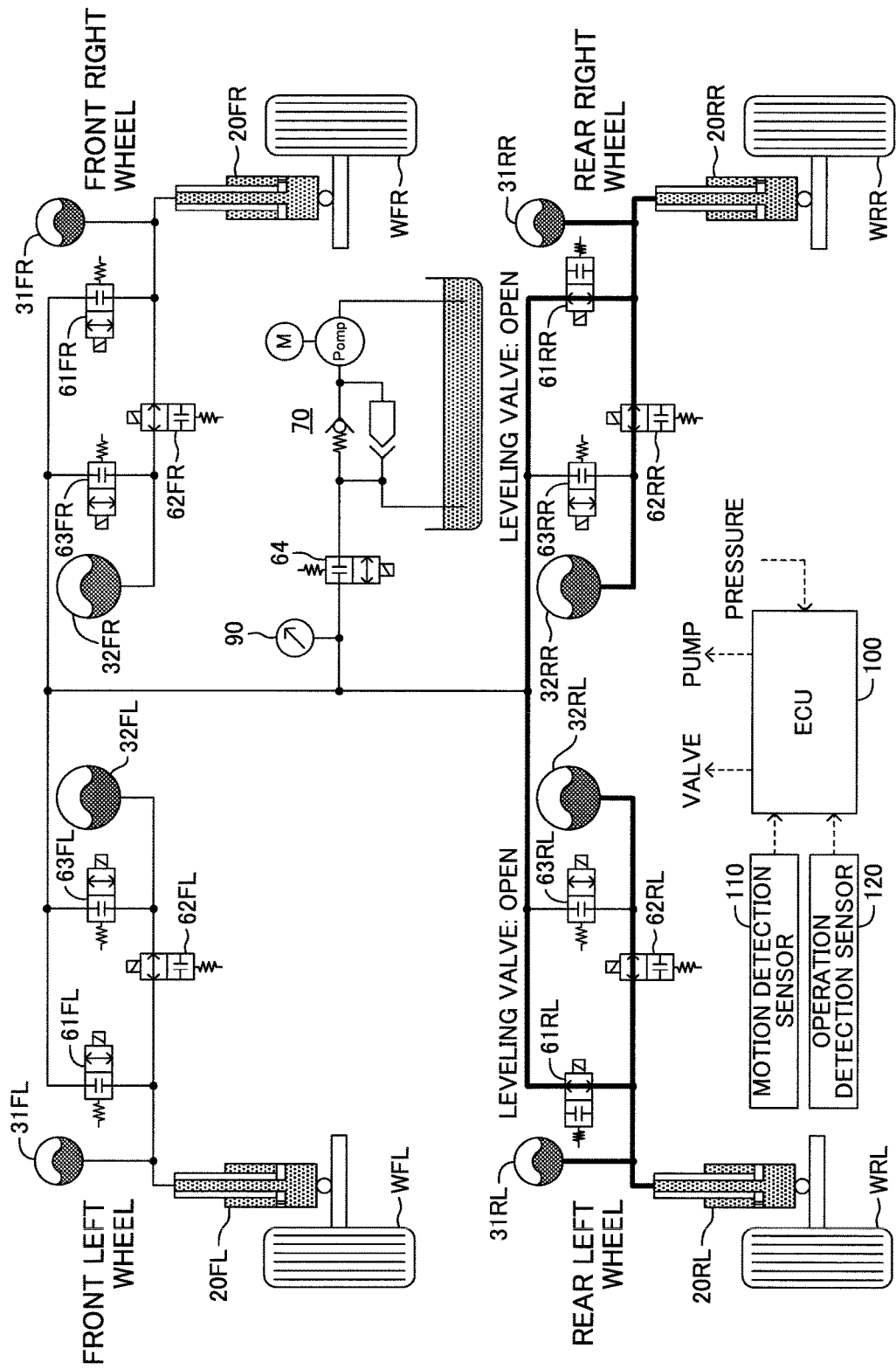
FIG. 8 is an explanatory diagram for illustrating a communication state between hydraulic cylinders for the front left/right wheels.

Thus, as illustrated in FIG. 8, the hydraulic cylinders 20RL and 20RR for the rear left and right wheels WRL and WRR (including the high gas springs and the low gas springs) communicate to each other. Thus, the working fluid in the hydraulic cylinder 20 operating in the contraction direction for the one of the rear left and right wheels can be moved to the hydraulic cylinder 20 for the another of the rear left and right wheels. As a result, a force received from the road surface by the hydraulic cylinder 20 of the one of the rear left and right wheels, and acting as the contraction operation in the roll stiffness decrease subject wheels can be used as a force acting as an extension operation of the hydraulic cylinder 20 for the another of the rear left and right wheels. Thus, the wheel articulation of each of the rear left and right wheels WRL and WRR increases, and the another of the rear left and right wheels can thus be prevented from being lifted from the road surface (road holding property can be improved).

When those pieces of processing are repeated, and the rear wheel vehicle height left/right difference ΔLF becomes more than the second rough road determination threshold ΔL2 (Yes in Step S38), the ECU 100 advances the processing to Step S40, brings the bypass valves 63FL and 63FR for the front left and right wheels WFL and WFR into the open state, and brings the spring switching valves 62FL and 62FR into the closed state. In this case, the open/closed states of the respective valves for the rear left and right wheels WRL and WRR are the same as those in Step S39.

Figure 9:
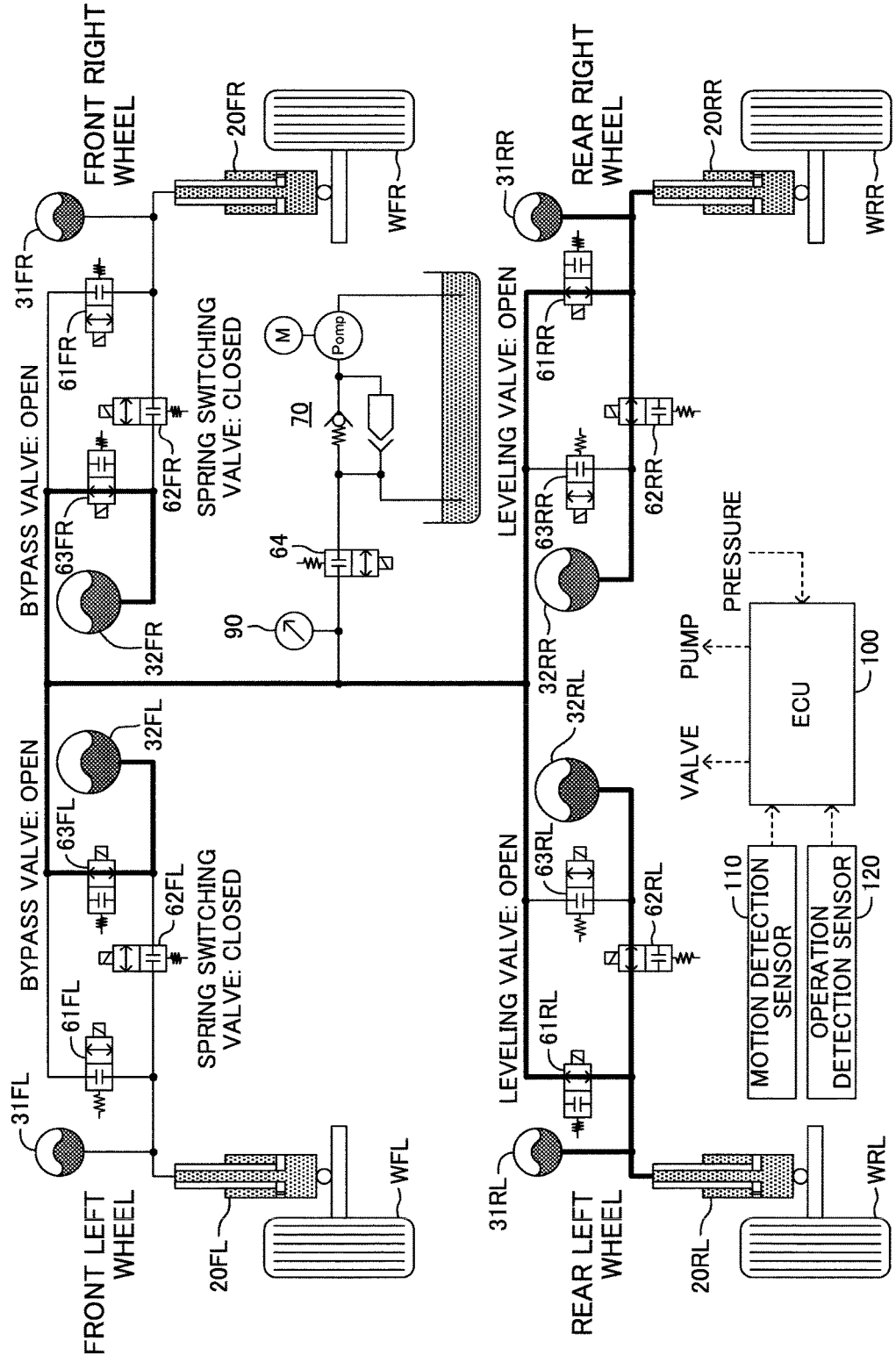
FIG. 9 is an explanatory diagram for illustrating a communication state of the hydraulic cylinders for the front left/right wheels and the low gas springs for the rear left/right wheels.

Thus, as illustrated in FIG. 9, in addition to the two high gas springs 31RL and 31RR and the two low gas springs 32RL and 32RR for the rear left and right wheels WRL and WRR that have been in communication, the two low gas springs 32FL and 32FR for the front left and right wheels WFL and WFR are caused to communicate to the hydraulic cylinders 20RL and 20RR for the rear left and right wheels WRL and WRR. In this case, the hydraulic cylinders 20FL and 20FR and the high gas springs 31FL and 31FR for the front left and right wheels WFL and WFR do not communicate to the hydraulic cylinders 20RL and 20RR for the rear left and right wheels WRL and WRR.

Thus, through increase of the number of gas springs communicating to the hydraulic cylinders 20RL and 20RR for the rear left and right wheels WRL and WRR, the wheel rates of the rear left and right wheels WRL and WRR decrease. In other words, a hydraulic pressure absorption capacity of the gas springs communicating to each of the hydraulic cylinders 20RL and 20RR for the rear left and right wheels WRL and WRR can be increased more than the hydraulic pressure absorption capacity of the gas springs provided for each of the wheels, thereby further decreasing the wheel rates. As a result, the roll stiffness of each of the rear left and right wheels WRL and WRR can further be decreased, thereby increasing the wheel articulation of each of the rear left and right wheels WRL and WRR. As a result, the road holding property of each of the rear left and right wheels WRL and WRR can further be increased.

Moreover, when the low gas springs 32FL and 32FR for the front left and right wheels WFL and WFR are caused to communicate to the hydraulic cylinders 20RL and 20RR for the rear left and right wheels WRL and WRR, the bypass valves 63FL and 63FR for the front left and right wheels WFL and WFR are opened while the spring switching valves 62FL and 62FR for the front left and right wheels WFL and WFR are closed, and the hydraulic pressure variation in the hydraulic cylinders 20FL and 20FR for the front left and right wheels WFL and WFR caused by the opening operation is thus not induced. Thus, the vehicle heights at the front left and right wheels WFL and WFR can be prevented from changing.

The ECU 100 repeats those pieces of processing at a predetermined calculation cycle, thereby carrying out the switching processing for the wheel rates in accordance with the vehicle height left/right difference. As a result, the off-road travel performance can be improved.

In order to prevent the switching of the wheel rates from hunting, when the vehicle height left/right difference ΔLF (or ΔLR) once exceeds the second rough road determination threshold ΔL2, the ECU 100 only needs to maintain the determination result (ΔLF>ΔL2 or ΔLR>ΔL2), thereby continuing the processing in Step S37 or in Step S40 until a predetermined reset condition set in advance is satisfied. Moreover, when the vehicle height left/right difference ΔLF (or ΔLR) once exceeds the first rough road determination threshold ΔL1 while the vehicle left/right difference ΔLF (or ΔLR) is equal to or less than the second rough road determination threshold ΔL2, the ECU 100 only needs to maintain the determination result (ΔLF>ΔL1 or ΔLR>ΔL1), thereby continuing the processing in Step S36 and in Step S39 until a reset condition set in advance is satisfied. As those reset conditions, for example, a condition that the vehicle height left/right difference ΔLF (and ΔLR) be continuously maintained to be equal to or less than a reset threshold ΔL3 (a value used for determination for a flat road) for a set period can be employed.

Moreover, when the low gas springs 32 are added to form the communication between the front and rear wheels (states illustrated in FIG. 7 and FIG. 9), and then the vehicle height left/right difference disappears to cause switch to the street driving control (S34), the spring switching valves 62 for the added low gas springs 32 (the low gas springs 32RL and 32RR for the rear left and right wheels WRL and WRR caused to communicate to the hydraulic system for the front left and right wheels WFL and WFR in Step S37 and the low gas springs 32FL and 32FR for the front left and right wheels WFL and WFR caused to communicate to the hydraulic system for the rear left and right wheels WRL and WRR in Step S40) need to be opened. In this case, the hydraulic pressure in the low gas spring 32 and the hydraulic pressure in the hydraulic cylinder 20 for the same wheel (referred to as relevant wheel) are not always the same, and when the spring switching valve 62 is opened, the vehicle height may change at the wheel position. Thus, after the ECU 100 adjusts the hydraulic pressure in the low gas spring 32 so as to be the same as the hydraulic pressure in the hydraulic cylinder 20, the ECU 100 opens the spring switching valve 62, thereby preventing the vehicle height from changing.

In this case, the hydraulic pressure in the hydraulic cylinder 20 for the relevant wheel W needs to be detected before the hydraulic pressure adjustment for the low gas spring 32. For the hydraulic pressure detection for the hydraulic cylinder 20, it is only necessary to cause only the hydraulic cylinder 20 subject to the hydraulic pressure detection to communicate to the common supply/discharge passage 54, and to read the detection value of the pressure sensor 90. In other words, it is only necessary to open the leveling valve 61 for the relevant wheel, and to read the detection value of the pressure sensor 90 while the leveling valves 61 and the bypass valves 63 for the wheels other than the relevant wheel are opened, and the bypass valve 63 and the spring switching valve 62 for the relevant wheel and the source valve 64 are closed.

Moreover, the hydraulic pressure adjustment for the low gas spring 32 only needs to be carried out as in Steps S15 to S19 of the vehicle height increase control routine (FIG. 2) or as in Steps S24 to S26 of the vehicle height decrease control routine (FIG. 3) (in this case, the pressure value detected by the pressure sensor 90 is set to the vehicle height adjustment completion pressure P0). As a result, the vehicle height change caused by the opening operation for the spring switching valve 62 can be prevented from being generated.

With the suspension system according to this embodiment described above, the individual bypass passage 53 and the bypass valve 63 are provided, the supply/discharge of the working fluid to/from the hydraulic cylinder 20 and the high gas spring 31 and the supply/discharge of the working fluid to/from the low gas spring 32 can be carried out independently of each other. As a result, the hydraulic system without low gas springs 32 can be used for the vehicle height adjustment, and the vehicle height adjustment can thus be completed quickly by using a small amount of the working fluid.

Accordingly, a required supply flow rate of the working fluid can be decreased in the working fluid supply/discharge device 70, and the configuration can thus be simplified. For example, a discharge flow rate of the pump 71a can be decreased. Moreover, a pressure accumulation accumulator and the like for compensating the discharge flow rate of the pump need not to be provided as for a related-art device. As a result, the weight of the working fluid supply/discharge device 70 can be decreased.

Moreover, the hydraulic pressure in the low gas spring 32 is adjusted so as to be equal to the hydraulic pressure in the hydraulic cylinder 20 after the vehicle height adjustment, and the vehicle height variation can be prevented from being generated even when the spring switching valve 62 is opened so as to switch the wheel rate.

Moreover, when the vehicle height left/right difference exceeds the first rough road determination value ΔL1 on one of the front and rear wheels during the off-road travel, the leveling valves 61 for the left and right wheels (referred to as roll stiffness decrease subject wheels) on the side on which the vehicle height left/right difference is more than the threshold are opened. As a result, a force received from the road surface by the hydraulic cylinder 20 of one of the left and right wheels, and acting as the contraction operation in the roll stiffness decrease subject wheels can be used as a force acting as an extension operation of the hydraulic cylinder 20 for another of the left and right wheels. Thus, the roll stiffness decreases, the wheel articulation of the roll stiffness decrease subject wheels can be increased, and the another of the left and right wheels can thus be prevented from being lifted from the road surface (the road holding property can be increased).

Moreover, when the vehicle height left/right difference becomes more than the second rough road determination threshold ΔL2, the low gas springs 32 for the front/rear wheels are caused to communicate to each other. In other words, the low gas springs 32 for the left and right wheels (referred to as non-roll stiffness decrease subject wheels) in the opposite side in the longitudinal direction with respect to the roll stiffness decrease subject wheels are caused to communicate to the hydraulic system for the roll stiffness decrease subject wheels. In this case, the low gas springs 32 for the non-roll stiffness degrease subject wheels are not used for the non-roll stiffness decrease subject wheels, and are used solely for the roll stiffness decrease subject wheels. Therefore, for the roll stiffness decrease subject wheels, the hydraulic pressure absorption capacity of the gas springs communicating to one hydraulic cylinder 20 is more than the hydraulic pressure absorption capacity of the gas springs provided for each of the wheels. As a result, the roll stiffness of the roll stiffness decrease subject wheels can further be decreased, thereby further increasing the wheel articulation. As a result, the road holding property of the roll stiffness decrease subject wheels can further be increased.

Moreover, when the low gas springs 32 for the front/rear wheels are caused to communicate to each other, the bypass valves 63 are opened while the spring switching valves 62 for the non-roll stiffness decrease subject wheels are closed. Thus, the variation in the hydraulic pressures in the hydraulic cylinders 20 for the non-roll stiffness decrease subject wheels is not caused by this opening operation. Thus, the vehicle heights at the non-roll stiffness decrease subject wheels can be prevented from changing, and the vehicle body can thus be prevented from inclining in the longitudinal direction.

As a result, according to this embodiment, the travel performance can be improved in the off road state.

In the above, the suspension system according to this embodiment has been described, but the present invention is not limited to the above-mentioned embodiment, and various changes are possible within the range not departing from the object of the present invention.

For example, for a vehicle in which the roll stiffness of the front wheels WFL and WFR is set to be higher than the roll stiffness of the rear wheels WRL and WRR by vehicle specifications, it is desired to decrease the roll stiffness of the front wheels WFL and WFR as much as possible during the off-road travel (in the case where the road is determined to be a rough road). In this case, the wheel rate switching control only needs to be carried out so that the roll stiffness is decreased only for the front wheels WFL and WFR. For example, in the wheel rate switching control routine of FIG. 4, it is only necessary to remove the processing in Steps S33, S38, S39, and S40, and advance the processing to Step S34 when the determination of "No" is made in Step S32.

Moreover, according to this embodiment, when the vehicle height left/right difference becomes more than the second rough road determination threshold ΔL2, the two low gas springs 32 for the non-roll stiffness decrease subject wheels are configured to communicate to the hydraulic system for the roll stiffness decrease subject wheels. However, the two low gas springs 32 do not always need to communicate to each other, and the low gas spring 32 for only one of the left and right wheels of the non-roll stiffness decrease subject wheels may be caused to communicate to the hydraulic system for the roll stiffness decrease subject wheels. In this case, the hydraulic cylinder 20 needs to be contracted for the non-roll stiffness decrease subject wheel at the diagonal position with respect to the wheel W on the protruded road surface out of the roll stiffness decrease subject wheels (two left and right wheels), and the communication between the hydraulic cylinder 20 and the low gas spring 32 for the wheel W is preferably not shut off. Thus, the low gas spring 32 for the non-roll stiffness decrease subject wheel on the same side in the lateral direction as the wheel W on the protruded road surface only needs to communicate to the hydraulic system for the roll stiffness decrease subject wheels.

Moreover, as another modified example, the number (one or two) of the low gas springs 32 to communicate to the hydraulic system for the roll stiffness decrease subject wheels may be switched in accordance with a rough road determination level (vehicle height left/right difference). For example, the ECU 100 may be configured to store an intermediate rough road determination threshold ΔL12 more than the first rough road determination threshold ΔL1 and less than the second rough road determination threshold ΔL2, close one switching valve 62RL (or 62RR) for the left and right rear wheels WRL and WRR, and open the bypass valve 63RL (or 63RR) for the same wheel while the leveling valves 61FL and 61FR for the front left and right wheels WFL and WFR are opened when the front wheel vehicle height left/right difference ΔLF is more than the intermediate rough road determination threshold ΔL12, and equal to or less than the second rough road determination threshold ΔL2. Alternatively, the ECU 100 is configured to close one switching valve 62FL (or 62FR) of the front left and right wheels WFL and WFR, and open the bypass valve 63FL (or 63FR) for the same wheel while the leveling valves 61RL and 61RR for the rear left and right wheels WRL and WRR are opened when the same rough road determination condition as described above is satisfied on the side of the rear wheels WRL and WRR.

In other words, the ECU 100 is configured to cause the hydraulic cylinders 20 for the roll stiffness decrease subject wheels to communicate to each other, and cause the low gas spring 32 for one of the left and right wheels of the non-roll stiffness decrease subject wheels to communicate to the hydraulic system for the roll stiffness decrease subject wheels. Also in this case, the low gas spring 32 for the non-roll stiffness decrease subject wheel on the same side in the lateral direction as the wheel on the protruded road surface only needs to communicate to the hydraulic system for the roll stiffness decrease subject wheels.

According to this modified example, the wheel rate for the off-road travel (in the case of the rough road determination) can be switched between the two stages (among the four stages when stages for the normal travel are included), and the more appropriate wheel rate can be set.

Moreover, according to this embodiment, the left and right hydraulic cylinders 20 for the roll stiffness decrease subject wheels are caused to communicate to each other by opening the leveling valves 61 of the roll stiffness decrease subject wheels, but the bypass valves 63 for the roll stiffness decrease subject wheels may be opened in place of the leveling valves 61 or in addition to the leveling valves 61. In other words, it is only necessary to open the spring switching valve and at least one of the leveling valve 61 and the bypass valve 63 for each of the roll stiffness decrease subject wheels, and to cause the left and right hydraulic cylinders 20 for the roll stiffness decrease subject wheels to communicate to each other.

Moreover, according to this embodiment, the number of the gas springs provided for the hydraulic cylinder 20 for each of the wheels W is two (high gas spring 31 and low gas spring), but another spring may further be provided. For example, a relief gas spring for releasing the pressure in the hydraulic circuit when the pressure abnormally increases may be configured to always communicate to the hydraulic cylinder 20.

What is claimed is:

1. A suspension system, comprising:
a hydraulic cylinder, which is provided between a wheel holding member and a vehicle body on each of front/rear left/right wheels of a vehicle, the hydraulic cylinder being configured to store working fluid and extend or contract depending on a change in a distance between the wheel holding member and the vehicle body;
a first gas spring, which is provided so as to correspond to each of the hydraulic cylinders for the front/rear left/right wheels, the first gas spring comprising a first gas chamber and a first oil chamber communicating to the hydraulic cylinder in partitions, and being configured to function as a spring in a hydraulic system based on an amount of the working fluid stored in the first oil chamber changing depending on a hydraulic pressure in the hydraulic cylinder;
a second gas spring, which is provided for each of the hydraulic cylinders, the second gas spring comprising a second gas chamber and a second oil chamber communicating to the hydraulic cylinder in partitions, and being configured to function as a spring in the hydraulic system based on an amount of the working fluid stored in the second oil chamber changing depending on the hydraulic pressure in the hydraulic cylinder;
a spring switching valve, which is provided for each of the hydraulic cylinders, the spring switching valve being capable of switching between a state in which the communication between the hydraulic cylinder and the second gas spring is allowed and a state in which the communication is shut off;
wheel rate switching means for controlling the spring switching valve to switch a wheel rate; and
roll stiffness decrease means for setting, during rough road travel, one of the front left and right wheels and the rear left and right wheels as roll stiffness decrease subject wheels, and another one of the front left and right wheels and the rear left and right wheels as non-roll stiffness decrease subject wheels, to thereby cause the left and right hydraulic cylinders for the roll stiffness decrease subject wheels to communicate to each other while the spring switching valve is opened for each of the roll stiffness decrease subject wheels, and to thereby close the spring switching valve for at least one of the left and right wheels of the non-roll stiffness decrease subject wheels to cause the second gas spring shut off from the hydraulic cylinder for the wheel having the closed spring switching valve to communicate to the left and right hydraulic cylinders for the roll stiffness decrease subject wheels.

2. A suspension system according to claim 1, further comprising:
a working fluid supply/discharge device configured to supply or discharge the working fluid to/from each of the hydraulic cylinders;
a supply/discharge hydraulic pressure control circuit comprising a supply/discharge source passage serving as a passage that is connected to the working fluid supply/discharge device and through which the working fluid flows, and a source valve for opening or closing the supply/discharge source passage;
a vehicle height adjustment hydraulic pressure control circuit comprising a vehicle height adjustment passage being a flow passage for the working fluid for causing each of the hydraulic cylinders and the supply/discharge source passage to communicate to each other, and a vehicle height adjustment valve for opening or closing the vehicle height adjustment passage, the vehicle height adjustment passage and the vehicle height adjustment valve being provided for each of the hydraulic cylinders;
a second gas spring hydraulic pressure control circuit comprising a bypass passage for bypassing the spring switching valve and the vehicle height adjustment valve to cause each of the second gas springs and the supply/discharge source passage to communicate to each other and a bypass valve for opening or closing the bypass passage, the bypass passage and the bypass valve being provided for each of the hydraulic cylinders; and
vehicle height adjustment control means for bringing the spring switching valve and the bypass valve into a closed state, and bringing the source valve and the vehicle height adjustment valve into an open state, thereby causing the hydraulic cylinder and the working fluid supply/discharge device to communicate to each other to adjust the vehicle height,
wherein the roll stiffness decrease means is configured to, under a state in which the source valve is closed, bring the spring switching valve and at least one of the bypass valve and the vehicle height adjustment valve into the open state for each of the roll stiffness decrease subject wheels, thereby causing the left and right hydraulic cylinders for the roll stiffness decrease subject wheels to communicate to each other, and bring the spring switching valve and the vehicle height adjustment valve into the closed state and bring the bypass valve into the open state for at least one of the left and right wheels of the non-roll stiffness decrease subject wheels, thereby causing the second gas spring for at least one of the left and right wheels of the non-roll stiffness decrease subject wheels to communicate to the hydraulic cylinders for the roll stiffness decrease subject wheels.

3. A suspension system according to claim 2, further comprising vehicle height difference detection means for detecting a magnitude of a vehicle height difference between a pair of the left wheel and the right wheel, wherein the roll stiffness decrease means is configured to:
set, when the magnitude of the vehicle height difference is more than a first threshold, left and right wheels with the magnitude of the vehicle height difference being more than the first threshold, as the roll stiffness decrease subject wheels, and bring the spring switching valve and at least one of the bypass valve and the vehicle height adjustment valve into the open state for each of the roll stiffness decrease subject wheels, thereby causing the left and right hydraulic cylinders for the roll stiffness decrease subject wheels to communicate to each other; and further bring, when the magnitude of the vehicle height difference is more than a second threshold that is larger than the first threshold, the spring switching valve and the vehicle height adjustment valve into the closed state, and bring the bypass valve into the open state for at least one of the left and right wheels of the non-roll stiffness decrease subject wheels on the opposite side in the front/rear direction of the roll stiffness decrease subject wheels, and cause the second gas spring of at least one of the left and right wheels of the non-roll stiffness decrease subject wheels to communicate to the hydraulic cylinders for the roll stiffness decrease subject wheels.

4. A suspension system according to claim 1, further comprising:

hydraulic pressure storage means for detecting and storing, when a vehicle height adjustment is completed by the vehicle height adjustment control means, a hydraulic pressure in a hydraulic cylinder corresponding to a wheel for which the vehicle height adjustment is completed; and second gas spring hydraulic pressure adjustment means for bringing, after the vehicle height adjustment is completed, the source valve into the open state, the spring switching valve and the vehicle height adjustment valve corresponding to the wheel for which the vehicle height adjustment is completed into the closed state, and the bypass valve corresponding to the wheel for which the vehicle height adjustment is completed into the open state, thereby causing the second gas valve and the working fluid supply device to communicate to each other to adjust the hydraulic pressure of the second gas spring so that the hydraulic pressure of the second gas spring is equal to the hydraulic pressure stored in the hydraulic pressure storage means.

* * * * *